US012698630B2

(12) United States Patent
Yeo et al.

(10) Patent No.: US 12,698,630 B2
(45) Date of Patent: Aug. 4, 2026

(54) CONFIGURABLE CEILING GRID LIGHTING ASSEMBLY WITH T-BAR MOUNTED LINEAR SUPPORT ELEMENTS

(71) Applicant: Fusion Optix, Inc., Woburn, MA (US)

(72) Inventors: Terence Yeo, Boston, MA (US); Michael Demas, Charlestown, MA (US); Timothy Kelly, Brookline, MA (US)

(73) Assignee: 3LED, Inc., Woburn, MA (US)

( * ) Notice: Subject to any disclaimer, the term of this patent is extended or adjusted under 35 U.S.C. 154(b) by 402 days.

(21) Appl. No.: 17/669,026

(22) Filed: Feb. 10, 2022

(65) Prior Publication Data

US 2022/0162853 A1 May 26, 2022

Related U.S. Application Data

(63) Continuation-in-part of application No. 16/877,482, filed on May 18, 2020, now Pat. No. 11,396,751, (Continued)

(51) Int. Cl.

*E04B 9/00* (2006.01)
*E04B 9/06* (2006.01)

(Continued)

(52) U.S. Cl.

CPC .............. *E04B 9/006* (2013.01); *E04B 9/067* (2013.01); *E04B 9/225* (2013.01); *E04B 9/242* (2013.01); *F21S 8/026* (2013.01); *F21Y 2115/10* (2016.08)

(58) Field of Classification Search

CPC . E04B 9/04; E04B 9/006; E04B 9/067; E04B 9/225; E04B 9/242; E04B 9/247; F21S 8/026; F21Y 2115/10

(Continued)

(56) References Cited

U.S. PATENT DOCUMENTS 3,329,387 A * 7/1967 Fischer ..................... E04B 9/16 248/342
3,343,310 A * 9/1967 Netz ....................... F21V 21/04 52/28

(Continued)

OTHER PUBLICATIONS

CISCA Seismic Construction Handbook, Table of IBC 2012 Seismic Design Category D, E, & F Lighting Fixture Requirements on p. 10, Ceilings & Interior Systems Construction Association, 2013.

*Primary Examiner* — James J Buckle, Jr.

(57) ABSTRACT

The present disclosure generally relates to lighting assemblies, and more specifically, to a configurable modular lighting assembly for use within a ceiling grid system. The lighting assembly is easy to install and delivers lighting distributions tailored to optimally illuminate the surface ceiling panels as well as floors, walls and work surfaces below. The configurable modular ceiling grid lighting assembly comprises both standard ceiling grid components such as T-Bar, ceiling panels and suspension cables as well as novel linear support elements with integrated or removable optical assemblies and covering elements. When installed the ceiling grid lighting assembly provided further comprises ceiling panels that are held in-line, above, below or tilted relative to the existing ceiling grid plane and as such provide both aesthetically pleasing features and useful lighting distributions. Further embodiments illustrate how both appearance and lighting distributions can be controlled by selectively applying electrical power to individual light source channels.

55 Claims, 26 Drawing Sheets

Related U.S. Application Data which is a continuation-in-part of application No. 16/239,804, filed on Jan. 4, 2019, now abandoned.

(60) Provisional application No. 63/225,590, filed on Jul. 26, 2021, provisional application No. 63/000,649, filed on Mar. 27, 2020, provisional application No. 63/000,718, filed on Mar. 27, 2020, provisional application No. 62/849,199, filed on May 17, 2019.

(51) Int. Cl.

| | |
|---|---|
| ***E04B 9/22*** | (2006.01) |
| ***E04B 9/24*** | (2006.01) |
| ***F21S 8/02*** | (2006.01) |
| *F21Y 115/10* | (2016.01) |

(58) Field of Classification Search

USPC .......................................... 52/506.06, 506.07

See application file for complete search history.

(56) References Cited

U.S. PATENT DOCUMENTS

| | | | | | |
|---|---|---|---|---|---|
| 3,426,188 | A * | 2/1969 | Baranowski | F21V 21/00 | 52/28 |
| 3,512,313 | A * | 5/1970 | Harz | E04B 9/12 | 52/28 |
| 4,027,454 | A * | 6/1977 | Schuplin | E04B 9/242 | 52/506.07 |
| 4,047,336 | A * | 9/1977 | Stahlhut | F21S 8/02 | 52/28 |
| 4,363,082 | A * | 12/1982 | Roland | F21V 21/04 | 362/225 |
| 4,479,341 | A * | 10/1984 | Schuplin | E04B 9/127 | 52/712 |
| 5,161,878 | A * | 11/1992 | Degelmann | F21V 19/02 | 362/366 |
| 5,428,930 | A * | 7/1995 | Bagley | E04B 9/003 | 52/489.1 |
| 5,528,478 | A * | 6/1996 | Degelmann | F21V 13/10 | 362/291 |
| 5,777,857 | A * | 7/1998 | Degelmann | F21S 2/00 | 362/225 |
| 5,941,029 | A * | 8/1999 | MacLeod | E04B 9/006 | 24/336 |
| 6,029,414 | A * | 2/2000 | MacLeod | E04B 9/006 | 52/39 |
| 6,079,851 | A * | 6/2000 | Altman | F21V 19/008 | 362/217.05 |
| 6,341,466 | B1 * | 1/2002 | Kehoe | F16B 2/241 | 52/39 |
| 7,770,349 | B2 * | 8/2010 | Tedesco | E04B 9/122 | 52/506.07 |
| 8,453,407 | B2 * | 6/2013 | Tedesco | E04B 9/127 | 52/506.07 |
| 8,596,009 | B2 * | 12/2013 | Baxter | E04B 9/067 | 52/489.1 |
| 8,615,948 | B2 * | 12/2013 | Underkofler | E04B 9/067 | 52/506.07 |
| 8,667,756 | B1 * | 3/2014 | Sareyka | E04B 9/18 | 52/506.07 |
| 9,453,339 | B2 * | 9/2016 | Baxter | E04B 9/245 | |
| 2012/0047836 | A1 * | 3/2012 | Sareyka | E04B 9/30 | 52/506.06 |
| 2012/0102865 | A1 * | 5/2012 | Baxter | E04B 9/30 | 52/745.05 |
| 2013/0318905 | A1 * | 12/2013 | Underkofler | E04B 9/122 | 52/506.06 |
| 2015/0040494 | A1 * | 2/2015 | Lehane, Jr. | E04B 9/122 | 52/506.07 |
| 2017/0082252 | A1 * | 3/2017 | Casement | G02B 6/0051 | |
| 2021/0048169 | A1 * | 2/2021 | Dahlen | F21V 21/04 | |
| 2021/0348730 | A1 * | 11/2021 | Porciatti | F21S 4/28 | |

* cited by examiner (i) Diffuse Planar (No surface features)

(ii) Diffuse laser etched (iii) Diffuse lenticular (iv) Diffuse sawtooth (v) Diffuse layer (laminated)

(vi) Diffuse surface (coated)

(vii) Diffuse patterned

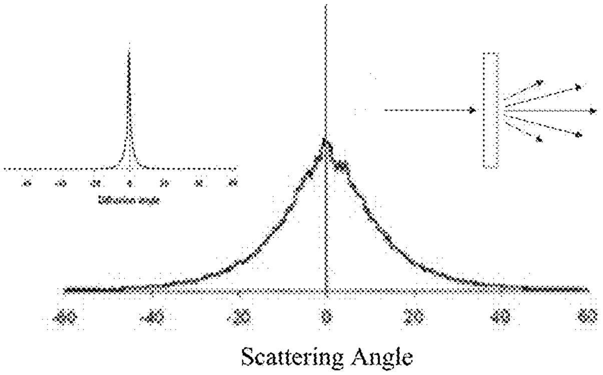

| Sample | Type | Height | ASTM D1003 | | | Scattering (FWHM) | | Gloss (60%) | |
|---|---|---|---|---|---|---|---|---|---|
| | | | T% | H% | C% | TD | MD | Side A | Side B |
| Clear Etched Light Guide | | 4.5mm | 89.4 | 12.5 | 98.6 | 1° | 1° | 129.9 | 110.2 |
| Edge-lit Signage Acrylic | | 4.0mm | 92.6 | 4.1 | 99.8 | 1° | 1° | 139.7 | 140.5 |
| (i) | Diffuse planar | 4.7mm | 90.6 | 97.1 | 9.1 | 10° | 16° | 62.4 | 63.5 |
| (ii) | Diffuse laser etched | 4.5mm | 92.8 | 94.5 | 3.7 | 20° | 18° | 85.7 | 64.3 |
| (iii) | Diffuse lenticular | 4.6mm | 86.9 | 92.3 | 23.6 | 25° | 2° | 86.5 | 11.9 |
| (iv-a) | Diffuse sawtooth | 4.4mm | 82.6 | 97.6 | 4.3 | 5° | 17° | 74.7 | 5.9 |
| (iv-b) | Diffuse sawtooth | 3.8mm | 91.7 | 84.9 | 13.0 | 5° | 17° | 78.5 | 5.9 |
| (iv-c) | Diffuse sawtooth | 4.8mm | 91.6 | 80.2 | 17.8 | 5° | 17° | 74.7 | 5.9 |
| (v-a) | Diffuse layer (laminated) | 4.6mm | 91.5 | 86.3 | 15.2 | 11° | 10° | 88.4 | 55.6 |
| (v-b) | Diffuse layer (laminated) | 4.6mm | 90.2 | 90.6 | 7.3 | 15° | 14° | 90.2 | 45.2 |
| (v-c) | Diffuse layer (laminated) | 4.6mm | 92.0 | 94.1 | 3.9 | 30° | 30° | 87.6 | 34.5 |
| (v-d) | Diffuse layer (laminated) | 4.6mm | 86.8 | 94.9 | 5.6 | 40° | 30° | 85.7 | 86.1 |
| (vi-a) | Diffuse surface (coated) | 4.5mm | 93.0 | 95.1 | 3.6 | 20° | 18° | 91.1 | 6.3 |
| (vi-b) | Diffuse surface (coated) | 4.5mm | 89.8 | 100 | 2.3 | 40° | 40° | 92.4 | 4.3 |

FIG. 11D (i) Medium (ii) Batwing (60deg)

(iii) Narrow / Low Glare (iv) Medium Asymmetric (v) Linear Spot (vi) Narrow Asymmetric

CONFIGURABLE CEILING GRID LIGHTING ASSEMBLY WITH T-BAR MOUNTED LINEAR SUPPORT ELEMENTS

RELATED APPLICATIONS

This application is a continuation in part of and claims the benefit of non-provisional U.S. application Ser. No. 16/877,482 titled "MODULAR CEILING SYSTEM WITH SUPPORT ELEMENTS FOR MOUNTING OF FUNCTIONAL MODULES" filed May 18, 2020; which is itself a continuation in part of non-provisional U.S. application Ser. No. 16/239,804 titled "SUPPORT ELEMENT FOR GRID CEILING SYSTEMS" filed Jan. 4, 2019. Furthermore, this application claims the benefit of provisional patent applications referenced by Ser. No. 16/239,805; namely, Ser. No. 62/849,199 titled "MODULAR CEILING SYSTEM AND METHOD" filed May 17, 2019, Ser. No. 63/000,649 titled "MODULAR FUNCTIONAL FIXTURE FOR USE WITH SUSPENDED CEILING GRID ARRANGEMENT AND METHOD FOR INSTALLATION" filed Mar. 27, 2020, and Ser. No. 63/000,718 "LIGHTING ARRANGEMENT FOR USE WITH SUSPENDED CEILING" filed Mar. 27, 2020. Additionally, this application claims the benefit of provisional application 63/225,590 filed Jul. 26, 2022.

TECHNICAL FIELD

The present disclosure generally relates to lighting assemblies, and more specifically, to a configurable modular lighting assembly for use within a ceiling grid system delivering lighting distributions tailored to optimally illuminate the surface ceiling panels as well as floors, walls and work surfaces below.

BACKGROUND

In recent times, the implementation of lighting devices utilized in many diverse applications, such as in office workspaces, warehouses, educational institutions, research laboratories, indoor and outdoor living spaces, industrial areas, vehicles and so forth to provide illumination for humans performing visual tasks has increased drastically. Contemporarily, lighting devices are also employed for aesthetic purposes to provide a visually comforting environment to a given person. However, with the passage of time, the structural integrity of such lighting devices attributed to the structural integrity of the structural component or structure such as the structural ceiling or the ceiling grid system continues to decline. Typically, the structural integrity refers to the ability to withstand and hold together under a load, including its own weight, without breaking or deforming excessively. It assures that the ceiling grid system will perform its designed function during reasonable use, for as long as its intended life span. Typically, any object is constructed with structural integrity to prevent catastrophic failure, which can result in injuries, severe damage, death, and/or monetary losses. However, conventional ceiling grid system tend to deteriorate with time and thus significantly lose their structural integrity and thus creates a need for a ceiling grid system having a high structural integrity.

Conventionally, such lighting systems are affixed to structural ceilings, walls and other building elements for support in order to illuminate their surrounding environments. Often, a given house or building has, for a given room, a structural ceiling supporting a ceiling grid arrangement (or a ceiling grid arrangement). Typically, the ceiling grid arrangement, also referred to as being a "suspended ceiling system", includes a plurality of tiles or panels hanging at about 30 to 50 centimeters approximately from the structural ceiling of the house or building. The ceiling grid arrangement further includes a plurality of T-Bars that are configured to hold the plurality of tiles in position. Additionally, a flush-finish of lower surfaces of the plurality of T-Bars, and the plurality of tiles by arranging each of the plurality of tiles in close contact is formed such that they appear as a continuous mono-planar ceiling surface. However, an appearance of such a conventional ceiling grid arrangement has a dull look and becomes unpleasant with passage of time and creates an unpleasant environment inside the given room of the house or building.

Moreover, the ceiling grid arrangements are provided with lighting fixtures arranged to illuminate surroundings, such as, for example a, cubical space in an office, a corridor of a house, and the like. Moreover, lighting fixtures are arranged to be supported in respect of the ceiling grid arrangements with an intention to achieve an aesthetically pleasant look. However, despite such intentions, the traditional ceiling grid arrangements are incapable of satisfying such desirable luminaires to meet the aforementioned expectations.

Major issues that are encountered with the traditional ceiling grid arrangements are a monotonous look, complex retrofitting, costlier replacements, and the like. On many occasions, an environment or workspace is provided with multiple small lighting devices, wherein the small lighting devices include multiple light sources. However, such a configuration leads to an increase in installation and maintenance costs, inefficient energy usage, wastage of resources and environmental pollution.

A further issue that is encountered with contemporary suspending ceiling arrangements is that replacing the ceiling grid arrangements, for example when generally refurbishing a given building in which a ceiling grid arrangement is installed, generates a lot of waste material that is potentially not straightforward to recycle or reuse; moreover, such waste material can be environmentally disadvantageous.

Therefore, taking the aforementioned problems into consideration, there exists a need to overcome the aforementioned drawbacks associated with the existing lighting assemblies and issues with installation of such lighting assemblies in a ceiling grid arrangement.

SUMMARY

Throughout the present disclosure, the term "ceiling grid system" refers to any ceiling system consisting of a ceiling grid suspended or hung at a height below a structural ceiling of an architecture, such as a room of a house, or a building. It will be appreciated that the structural ceiling is an overhead interior surface that covers, namely defines, an upper limit of a room. The space between the structural ceiling and the top of the suspended ceiling grid is commonly referred to a "ceiling plenum" or "plenum space". Common items positioned within a plenum space include HVAC ducts, HVAC vents, lighting fixtures, sprinkler heads. Typically these are hidden from view by the ceiling grid system. Optionally, the ceiling grid system comprises a grid formation constructed using metallic bars. Furthermore, the grid formation includes pluralities of openings, wherein removable panels (ceiling panels) and/or cover elements are positioned to cover the entire structural ceiling from below. Furthermore, the grid formation is configured to accommodate various electronic and/or electrical devices for providing a plurality of services in the room. Examples of various electronic and electrical devices may include at least one of: lights, alarms, sensors, ventilation fans, heaters, humidifiers, and the like. Optionally, the ceiling grid system may include a power system for supplying electric power to the various electrically and/or electronically operated ceiling devices.

In a typical example, the structural ceiling may be at a height of 2.5 meters from a floor (not shown) of the room. In such an example, the height below the structural ceiling for holding the ceiling grid system may be 0.25 meters from the height of the structural ceiling, i.e., 2.25 meters from a floor of the room. A distance known as the "plenum height". Furthermore, the ceiling grid system is suspended or hung at the plenum height using the hanging wires that are securely fixed to the structural ceiling. Optionally, the hanging wires can be hinged, hooked, tied, coupled, plastered securely, or fixed to the structural ceiling. In some applications it is desirable to eliminate all items from within the plenum space and minimize the plenum space to essentially zero height, a case where there is little or no space between the structural ceiling and the top of the of the ceiling grid system. This is sometimes referred to as a "zero plenum" approach.

The ceiling grid T-Bars of the ceiling grid system are hardware components such as an elongate rigid spine extending between terminal ends of the structural ceiling. Additionally, the T-Bars comprises an inverted T-shaped structure formed via the flat horizontal portion integral to the vertical portion. Furthermore, the ceiling grid T-Bars include either a fixed anchor or an adjustable anchor for attachment to an adjacent member, such as another T-Bar or other holding for securely holding or suspending the T-Bars. Optionally, the T-Bars are conjoined to the hanging wires, either by hooking, welding, gluing, and so forth. Moreover, the T-Bars include tracks or holes wherein the hanging wires can be coupled to and/or can be latched onto for supporting (i.e., for holding or suspending) the ceiling grid system from the structural ceiling. Furthermore, the T-Bars of the ceiling grid system form a series of openings into which the plurality of ceiling panels can be arranged.

In drop ceiling environments such as office spaces and residential homes, the plurality of T-Bars defining the array of T-Bar cells acts as a support grid that holds ceiling panels in place to form a drop ceiling. To form the ceiling grid, typically the T-Bars running in a first direction are long T-Bars, long enough to span an entire room (or as far as possible in case of a larger room where it is impractical to have the T-Bars spanning the entire length of the room) are used. Moreover, in a second direction, perpendicular to the first direction, shorter T-Bars are located which merely extend between adjacent long T-Bars. Additionally, apart from the plurality of ceiling panels, the T-Bars are also capable of supporting air conditioning returns and registers, as well as light fixtures and other equipment.

Furthermore, the term "ceiling panels" as used herein relates to a lightweight structure, usually a shallow cuboidal structure, having a length, a breadth, and a height which are placed within the opening formed by the T-Bars cells for covering the structural ceilings. Further, dimensions of the plurality of ceiling panels are based on the parallelepiped lattice allowed by the arrangement of the ceiling grid T-Bars to accommodate therein. Optionally, the plurality of ceiling panels are a plurality of substantially identical panels, each panel being substantially rectangular in form, when viewed from the room. Optionally, the plurality of ceiling panels includes edges, wherein, in operation, the edges of the ceiling panels rest on the horizontal-portion of the T-Bars. Optionally, the plurality of ceiling panels include at least one edge having one or more lengthwise protruding lips and/or one or more lengthwise grooves along the whole length of the edge. The protruding lips and/or one or more lengthwise grooves of the plurality of ceiling panels enable the ceiling panels to be securely held (namely supported) on the horizontal-portion of the T-Bars. The horizontal portions of the ceiling grid T-Bars define a ceiling grid plane i.e., the ceiling grid plane for the plurality of ceiling panels. Specifically, the horizontal portions of the T-Bars define the ceiling grid plane for the plurality of ceiling panels.

Two primary types of ceiling panels are typically used in suspended ceiling systems, acoustical ceiling panel and drywall ceiling, and the transition between them in the illustrated configuration. Drywall ceiling panels, also known as plasterboard, sheet rock, gypsum board, or gypsum panel, are typically comprised of a mixture comprising calcium sulfate dihydrate (gypsum) and fibrous material sandwiched between thick sheets of paper. Typically, they are cut to size as needed from large sheets and attached to a ceiling grid by means of adapter clips and fasteners such as screws. After installation they are typically coated with some form of drywall coating, typically gypsum based, to fill in void spaces and planarize the surface, often as a substrate for painting. Drywall coating can optionally be applied in a manner creating a textured surface which may be aesthetically desirable in some applications. The combination of drywall, drywall coating, and painting can provide a wide variety of desirable aesthetic finishes which can be customized at the installed location. Acoustic ceiling panels are typically prefabricated gypsum panels sized to lay in ceiling grid systems supported on edges by ledges within the grid system such as horizontal flanges of T-Bars. They are typically smaller is size and more porous and lighter weight than drywall ceiling panels and can be easily added to or removed from a ceiling grid system. FIG. 10A is an illustration of a ceiling grid system, in accordance with an embodiment of the present disclosure.

The term "ceiling grid plane" used herein refers to an imaginary plane, parallel to a floor or flooring surface of the given room, along which typically conventional ceiling panels are arranged. Further, in or along the ceiling grid plane, the conventional ceiling panels are positioned or arranged mutually adjacent and parallel to each other. Furthermore, each of the horizontal portion of the T-Bars are planar and parallel to each other. Furthermore, each of the horizontal portion being in the same plane (i.e., the ceiling grid plane) provides a planar structure at lower surfaces of the T-Bars arrangement. Moreover, the planar structure at lower surfaces of the T-Bars arrangement also provides the ceiling grid plane.

The term "linear support element" refers to a continuous solid structure including a shape that is configured to hold the plurality of ceiling panels and either replace a T-Bar or mount securely onto the T-Bars. The linear support element (or elongate supporting element) is typically arranged parallel to the edge of the ceiling grid T-Bars that constitute or define the at least one T-Bar cell. The linear support element may also be referred to as a support housing attributed to the functionality of the linear support element to hold and/or support multiple ceiling elements. Furthermore, the linear support element is fabricated in a manner for differently positioning the ceiling panels with respect to the ceiling grid plane. Additionally, each of the linear support element is fabricated from various elements (i.e., linear and lateral linear support elements). For example, the various elements can be continuous straight or curved bars, beams, planks, and the like. Optionally, the various elements can be detachably coupled for forming the at least one linear support element. Alternatively, the linear support element has monolithic structures i.e., a continuous structure that is fashioned out of a block; furthermore, the block can be block of metal, alloy, plastics material, wood, and the like. Additionally, materials for manufacturing the linear support element may include metals, metal alloys, hardened polyvinyl materials, and the like. Furthermore, the various elements are positioned linearly and laterally to form a structure that enables the at least one linear support element to hold plurality of ceiling panel and electrically and/or electronically operated ceiling device. Furthermore, the various elements are positioned linearly and laterally, to form a recess structure to accommodate the plurality of ceiling panels and electrically and/or electronically operated ceiling devices.

The term "lighting assembly" refers to a lighting arrangement comprising various electrical and/or electronic components for providing different types and intensities of illumination to the associated room, wherein the lighting assembly is accommodated within the ceiling grid system. For example, different types of electrical and/or electronic components include, but is not limited to, light sources such as LEDs, at least one optical element such as a light guide, lens, diffuser, reflector and so forth. Some ceiling grid lighting assembly embodiments described in the present application enable unique ceiling grid assemblies that extend only minimally above the top of the T-Bar array but have optical cavities recessed above the ceiling rid plane. Such ceiling grid assemblies can be mounted very close to structural ceiling if desired to minimize the plenum height.

The present disclosure seeks to provide an improved modular lighting assembly for a ceiling grid system that is easier to manufacture, install and reconfigure or repair after initial installation (for example to achieve a modified functionality). Further, the improved modular lighting assembly is inexpensive to manufacture i.e., attributed to the simplified manufacturing and design, easier to recycle or reuse when a building incorporating the ceiling grid system is being dismantled or generally refurbished. Furthermore, the present disclosure seeks to provide an improved light assembly for providing an improved control of light fixtures and the power supply to the light fixtures. Furthermore, the present disclosure seeks to provide an improved lighting assembly with a modular functional fixture that is capable of accommodating various objects such as optical elements, utility elements, light sources, power modules, speakers, and the like. Furthermore, the present disclosure seeks to provide an improved, robust and flexible lighting assembly by virtue of operation to cope with varying user requirements. Moreover, the present disclosure also seeks to provide an improved energy-efficient lighting assembly. Furthermore, the present disclosure also seems to provide a lighting assembly that functions like a light fixture having a unique performance and aesthetic benefits and comprises of lighting components that integrate with the ceiling grid T-Bars, which provide structural support, and the plurality of ceiling panels which in some embodiments provide light reflectance and light distribution control. The present disclosure, in some embodiments, provides a light distributing reflective cavity that includes a reflective panel; either a standard ceiling panel or an embodiment with customized reflectance properties (specular or diffuse surface, surface texture, surface geometric features, etc.) Moreover, in the present disclosure, the embodiments can be configured to create a lighting cavity, at, below, or above the ceiling grid plane.

Embodiments of the present disclosure substantially eliminate, or at least partially address, the aforementioned problems in the prior art, and provide an improved lighting assembly to provide more uniform light distribution patterns that mitigate visual discomfort and are aesthetically appealing to a given viewer. Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by matching numbers.

Embodiments of the present disclosure will now be described, by way of example only, with reference to the following diagrams:

FIG. 11A showing a rigid linear LED board and FIG. 11B showing a flexible strip provided on a reel and which can be cut to a required length.

FIG. 11D is table containing optical properties of various embodiments of edgelit optical elements.

DETAILED DESCRIPTION

Figure 1A:
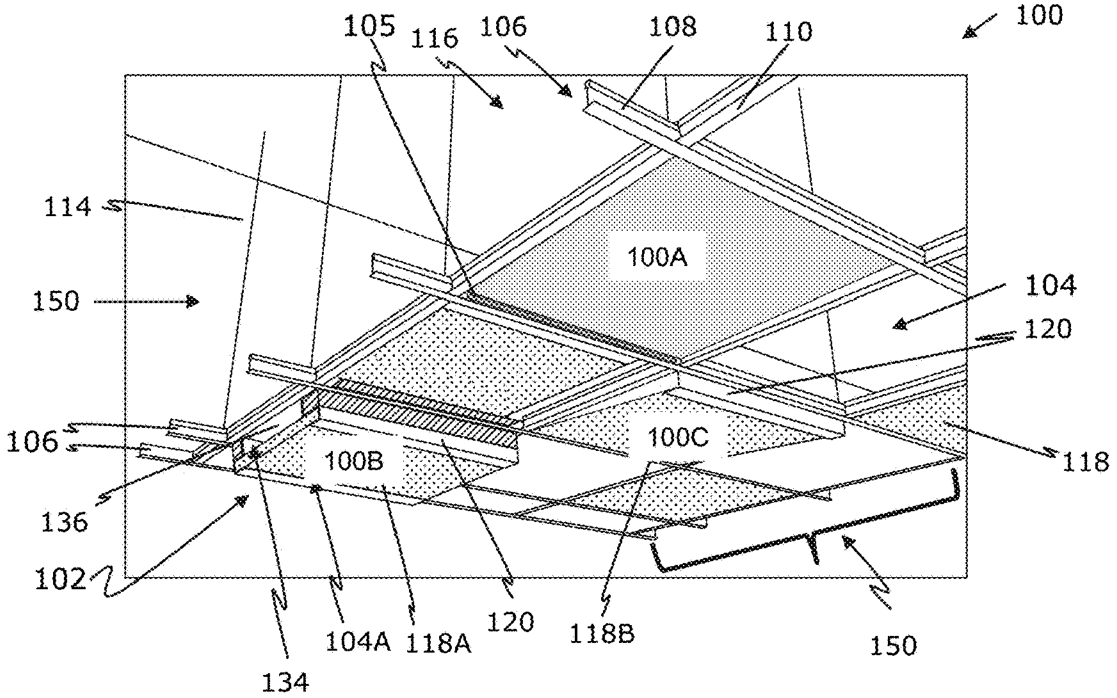
FIG. 1A is an illustration of a ceiling grid system, in accordance with an embodiment of the present disclosure.

The following detailed description illustrates embodiments of the present disclosure and ways in which they can be implemented. In overview, embodiments of the present disclosure are concerned with a lighting assembly to provide an aesthetically appealing appearance to the ceiling grid system and its associated lighting assembly and for providing various light distribution patterns in an environment.

Although some modes of carrying out the present disclosure have been disclosed, those skilled in the art would recognize that other embodiments for carrying out or practicing the present disclosure are also possible. Furthermore, the embodiments of the present disclosure also provide a lighting assembly which either replaces one or more T-Bars in a given ceiling grid cell or is supported by a T-Bar such as by mounting over the vertical leg of the T-Bar or by sliding along and receiving the horizontal leg of the given T-Bar.

Labeled items of illustrated lighting assembly embodiments FIGS. 7-17 are as follows wherein “XX” indicates the Figure number;

100 Ceiling Grid System
106 T-Bar
107 T-Bar Height (“Zero Plenum Height”)
108 T-Bar Horizontal Portion
110 T-Bar Vertical Portion
111 T-Bar Anchor
116 Structural Ceiling
117 Surrounding Ceiling Panel
120 Suspension Cable or Wire
XX00 Ceiling Grid Lighting Assembly
XX01 Linear Lighting Module
XX02 Linear Support Element
XX03 T-Bar Feature on Linear Support Element
XX04 Assembly Ceiling Panel
XX05 Optical Assembly (LED, Board, Optics)
XX06 Printed Circuit Board (PCB)
XX07 Light Emitting Diode (LED)
XX08 Primary Optical Element
XX09 Reflector
XX10 Secondary lens
XX12 Ceiling Grid Plane
XX13 Electrical Connector
XX15 Outer optical lens
XX14 Optical Cavity
XX16 Covering Element
XX18 Assembly ceiling panel
XX22 T-Bar Mounting Feature or Bracket
XX24 Ceiling Panel Support Feature
XX26 Power Source/Driver
XX28 Utility Component
XX30 Optical Element Light Distribution
XX57 Non-Optical Cavity Typically, an optical element comprises at least one of: a light guide, an edgelit diffuser, a direct lit diffuser, a reflector, a refractive lens, a diffractive lens. As represented, a light guide is an optical element which has one or more input faces along its edges into which light from a light source enters and utilizes internal reflection to propagate a portion of light within the optical element by multiple internal reflections while simultaneously outcoupling a portion of light, typically light guides have high transmission (>90%), low haze (<1%) and high clarity (>99%). An edge-lit diffuser is also lit from one or more of its edges but its primary function is to diffuse or scatter any light that enters into its bulk material. An edge-lit diffuser significantly has much lower clarity than a light guide (typically less than 50%) and much higher haze (typically more than 50%). The edge-lit diffuser can further comprise a combination of internal light scattering and light redirecting surface features. The light redirecting features may be regular, such as lines or ridges, or could be a random pattern. Edgelit diffusers also typically have much high lower levels of surface gloss than light guides. This is because the outer surfaces are not required to allow total internal reflection as is the case with light guide materials. In other embodiments, the optical element can be implemented as a bent mirror that reflects light incident thereon along a first path (and at a first angle) along a second path (and at a second angle) different from the first path. A direct lit diffuser is another optical element wherein light is incident upon the largest area face of the optical element and light is transmitted through the direct lit diffuser lens that scatters light, diffuses light or enables reduction in intensity of light.

Embodiment optical assemblies in the ceiling grid lighting assembly embodiments of comprise at least one of; a LED light, an incandescent light, a monochromatic light, a laser, and a combination thereof. The most typical embodiments are of a linear array of LED light sources arranged on an LED boards which can be rigid printed circuit board (PCB) or flexible and selectively cut to length in a "tape-like" format.

Figure 1B:
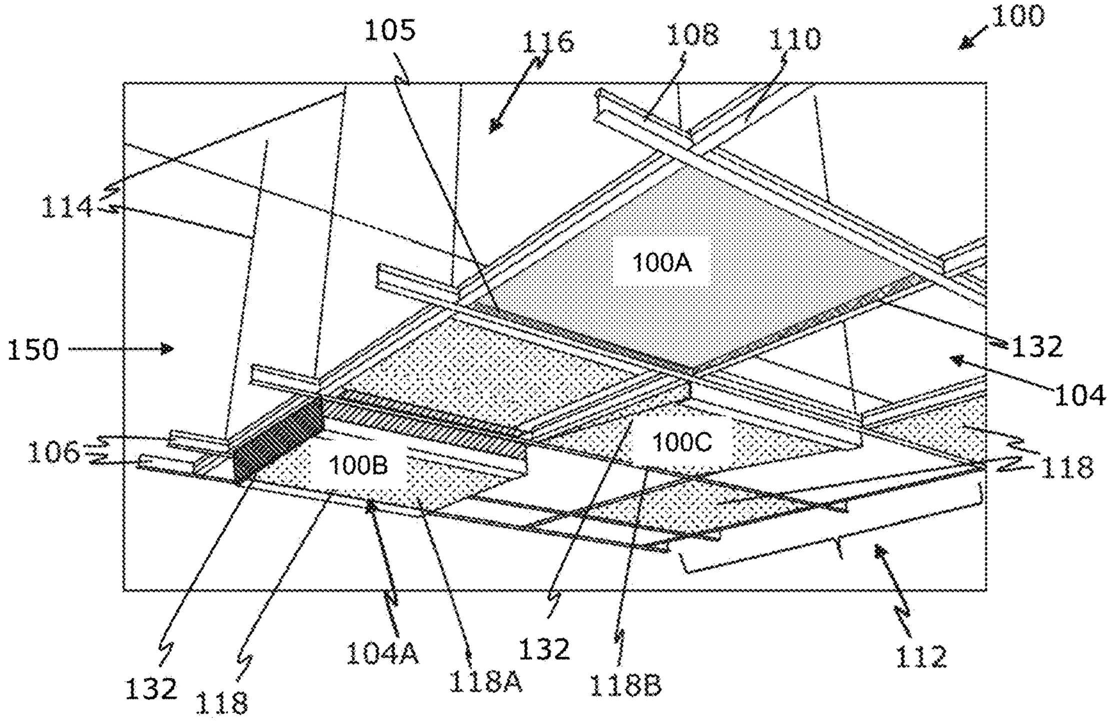
FIG. 1B is an illustration of the ceiling grid system, comprising at least one covering element, in accordance with an embodiment of the present disclosure.

FIG. 1A and FIG. 1B are illustrations of an overall ceiling grid system (also referred to as a suspended ceiling system), which contains various embodiments 100A, 100B and 100C of the modular ceiling grid lighting assembly wherein FIG. 1A shows embodiment assemblies without covering elements and FIG. 1B shows embodiment assemblies with covering elements. Notably, the differentiating feature of FIG. 1B of the present disclosure is depicted with a closed or covered perspective view whereas the open view (i.e., FIG. 1A) is illustrated to depict the common configuration therein and thus illustrates a view that does not cover any openings or gaps in the ceiling grid system 100.

The ceiling grid system comprises the plurality of ceiling panels 118, wherein the plurality of ceiling panels 118 are arranged in the array of cells 104 defined by the T-Bars 106. Typically, the series of openings formed by the T-Bars 106 are in an array i.e., the series of openings are formed in a number of grids of rows and columns. In an example, the grid of openings may include 20 rows and 50 columns. In another example, the grid of openings may include 10 rows and 100 columns. Further, the array of cells 104 is a parallelepiped lattice formed by the arrangement of the T-Bars 106. Moreover, the flat vertical portion 110 of the T-Bars 106 may form the boundary of the opening of the ceiling grid system 100, wherein the plurality of ceiling panels 118 are positioned. Furthermore, a structure of the array of T-Bar cells 104 may include ceiling panels having rectangular shapes, square shapes, rectangular shapes, rhombic shapes, and so forth.

The ceiling grid system 100 comprises several ceiling grid lighting assembly 101 (later shown in greater detail of various embodiments) for providing the required illumination in the room or structure within which the ceiling grid system 100 is located. Typically, the ceiling grid lighting assembly 100 comprises the linear lighting module comprising a linear support element 102 with integrated or removable optical assemblies 105 to be supported by the ceiling grid T-Bars 106 and configured to provide illumination to the room associated with the ceiling grid system.

As shown, in FIGS. 1A and 1B, the ceiling grid system comprises an array of T-Bar cells 104 having ceiling grid T-Bars 106 (also referred to as T-Bars), wherein each of the ceiling grid T-Bars 106 have flat end-portions i.e., horizontal portions 110 and vertical portions 108. Further, the plane containing the horizontal portions 110 of the ceiling grid T-Bars 106 defines a ceiling grid plane 112, wherein the ceiling grid plane 112 also defines the array of T-Bar cells 104. Notably, the ceiling grid plane 112 defining the T-Bar cells 104 are configured to accommodate a plurality of ceiling tiles 118 therein, wherein each T-Bar cell comprises one or more ceiling panels of the plurality of ceiling panels 118. Moreover, the ceiling grid system also comprises hanging wires 114 coupled to a structural ceiling 116 configured for providing structural integrity to the ceiling grid system.

Further shown, in FIGS. 1A and 1B, the linear support element 102 within the ceiling grid system couples to at least one T-Bar cell 104A within the T-Bar grid array 104 (also referred to as the array of T-Bar cells) that provides structural integrity to the ceiling grid lighting assembly 101. Typically, the at least one T-Bar cell 104A is configured to provide structural integrity the linear support element 102 by firmly and reliably accommodating the ceiling grid lighting assembly 100 therein. Since, the linear support element 102 is directly supported by the at least one T-Bar cell 104A, the ceiling grid lighting assembly 101 is more reliable and safer to use due to the high structural integrity imparted to the ceiling grid lighting assembly 101 via the at least one T-Bar cell 104A of the array of T-Bar cells 104.

Further shown, in FIGS. 1A and 1B, the ceiling grid lighting assembly 100 further comprises at least one assembly ceiling panel 118A associated with the at least one T-Bar cell 104A. Typically, each of the at least one assembly ceiling panel 118A is associated with each of the at least one T-Bar cell 104A of the T-Bar cells array 104. Herein, the at least one T-Bar cell 104A is configured to accommodate the at least one assembly ceiling panel 118A, wherein specifically the horizontal portions 110 of the T-Bars 106 of the at least one T-Bar cell 104A is configured to support the at least one assembly ceiling panel 118A. Alternatively stated, the at least one T-Bar cell 104A of the array of T-Bar cells 104 is configured to accommodate each of the at least one assembly ceiling panel 118A therein.

In an embodiment, the at least one assembly ceiling panel 118A is one of a standard ceiling panel, an acoustic ceiling panel, a decorative tile, a planar reflective panel or a non-planar reflective panel. Typically, the at least one assembly ceiling panel 118A are selected from one of the aforementioned types of ceiling panels based on the requirement of the implementation. In an example, the at least one central ceiling tile 118A may be a decorative tile for aesthetic appearance of the ceiling grid. In another example, the at least one central ceiling tile 118A may be a reflective panel configured to reflect incoming light from any light source for improved illumination and so forth.

In another embodiment, the at least one assembly ceiling panel 118A includes a reflective surface having one of an optical property: specular, diffuse, surface texture, redirecting light. Typically, the at least one assembly ceiling panel 118A comprises a reflective surface i.e., a surface capable of reflecting incident light, wherein the reflective surface comprises one of an optical property. Notably, the at least one assembly ceiling panel 118A may comprise more than one optical property. For example, the at least one assembly ceiling panel 118A may comprise the optical properties diffuse and redirecting light i.e., the at least one assembly ceiling panel 118A is enabled to diffuse and/or redirect incident light. Optionally, the at least one assembly ceiling panel 118A comprises the reflective surface, wherein the reflective surface comprises at least one of a colored surface, a textured surface. For example, the reflective surface of the at least one assembly ceiling panel 118A comprises a blue-colored surface. In another example, the reflective surface of the at least one assembly ceiling panel 118A comprises an angularly textured surface (such as, a surface that is configured to reflect light only when the light is incident thereon at specific angles. Optionally, such reflective surfaces are configured to reflect the light such that the light is scattered at different angles therefrom). It will be appreciated that such reflection and scattering of the incident of light in different colors and along different paths, enables to provide an aesthetically appealing ambiance within a room wherein the ceiling grid system is installed. Furthermore, such a reflection of the incident light that may be emitted from natural sources, reduces a requirement for providing artificial light within the room, thereby, allowing to reduce energy consumption (and consequently, cost thereof) for lighting purposes within the room. Optionally, the reflective surface comprises a textured surface, wherein the textured surface comprises at least one of: a light-diffusing surface, a specular surface, and/or angularly textured surface.

The ceiling grid lighting assembly further comprises at least one linear support element 102 configured to be arranged parallel to an edge of the ceiling grid T-Bars 106 defining the at least one T-Bar cell 104A, wherein the at least one linear support element 102 is configured to support the at least one assembly ceiling panel 118A above the ceiling grid plane 112 and parallel or inclined to the ceiling grid plane 112 to form a central optical cavity 122 within the at least one T-Bar cell 104A. Typically, the at least one linear support element 102 (or the linear support element) is arranged parallel to the edge of the ceiling grid T-Bars 106 defining the at least one T-Bar cell 104A and configured to support the at least one ceiling panel 118A above the ceiling grid plane 112 i.e., the at least one ceiling panel 118A is located completely above the ceiling grid plane 112. Typically, the edge of the ceiling grid T-Bars 106 may be the horizontal portion 110 of the ceiling grid T-Bar 106, wherein the linear support element 102 extends along and parallel to the edge of the T-Bars 106. Moreover, the at least one linear support element 102 is also configured to support the at least one assembly ceiling panel 118A in either a parallel manner or an inclined manner i.e., the at least one ceiling panel 118A is inclined at a desired angle above the ceiling grid plane 112 or placed parallelly to the ceiling grid plane 112 depending upon the implementation.

Further, as shown in FIGS. 1A and 1B, the at least one linear support element 102 is mounted in operation on the ceiling grid T-Bars 106, wherein the at least one linear support element 102 is configured to support the plurality of ceiling panels 118 thereon along with the T-Bars 106. The at least one linear support element 102, when in operation, supports the at least one assembly ceiling panel 118A higher than the ceiling grid plane 112. Specifically, the at least one linear support element 102 hold the edges of the at least one assembly ceiling panel 118A in a manner that the position of the at least one assembly ceiling panel 118A is raised relative to the ceiling grid plane 112. Furthermore, the position of the at least one ceiling panel 118A that is higher than the ceiling grid plane 112 can be defined as a condition, wherein an axis of abscissas of the at least one ceiling panel 118A is parallel to an axis of abscissas of the ceiling grid plane 112 when measured in a plane cartesian coordinate system. Optionally, the at least one ceiling panel 118A higher than the ceiling grid plane 112 includes a height that is more than a height of the ceiling grid plane 112. It will be appreciated that the heights of the at least one ceiling panel 118A and the ceiling grid plane 112 are measured from the floor of the given room. For example, the height of the at least one at least one assembly ceiling panel 118A may be 2.25 meters from the floor. In such an example, the at least one linear support element 102 holds the at least one assembly ceiling panel 118A at a height of 2.30 meters from the floor of the room. Beneficially, such a provision of support from the at least one linear support element 102 enables the at least one assembly ceiling panel 118A to be oriented either parallel to the ceiling grid plane 112 or inclined at a desired angle with respect to the ceiling grid plane 112, wherein the angle ranges from 0 to 90 degrees.

The at least one linear support element 102, when in operation, supports the at least one assembly ceiling panel 118A of the at least one assembly ceiling panel 118A at a tilted angle relative the ceiling grid plane 112. Optionally, the at least one linear support element 102 holds an edge of the at least one assembly ceiling panel 118A at a position that is higher than the ceiling grid plane 112 and another edge of the at least one assembly ceiling panel 118A at a position that is lower than the ceiling grid plane 112. Optionally, the at least one linear support element 102 holds an edge of the at least one assembly ceiling panel 118A a position that is higher than the ceiling grid plane 112 and another edge of the at least one assembly ceiling panel 118A is held on the ceiling grid plane 112. More optionally, the at least one linear support element 102 holds an edge of the at least one assembly ceiling panel 118A at a position that is lower than the ceiling grid plane 112 and another edge of the at least one assembly ceiling panel 118A is held on the ceiling grid plane 112. In an example, wherein the at least one linear support element 102 holds the at least one assembly ceiling panel 118A at a tilted angle relative to the ceiling grid plane 112, wherein a height of at least one edge of the at least one assembly ceiling panel 118A will be more than a height of the ceiling grid plane 112, and a height of at least one edge will be less than a height of the ceiling grid plane 112. Moreover, the edge having the greater height from the ceiling grid plane 112 is located opposite to the edge having the lesser height from the ceiling grid plane 112. For example, the height of the at least one assembly ceiling panel 118A may be 2.25 meters from the floor. In such an example, the at least one linear support element 102 holds the at least one assembly ceiling panel 118A in a manner that an edge of the at least one assembly ceiling panel 118A is at a height of 2.30 meters, and the opposite edge is at a height of 2.20 meters from the floor of the room, respectively.

However, it will be appreciated that the positioning and inclination of the at least one assembly ceiling panel 118A with respect to the ceiling grid plane 112 may be beneficially varied without limiting the scope of the disclosure. Alternatively stated, the ceiling grid lighting assembly incorporates linear lighting modules 101 comprising the linear support element 102 that, when in operation, supports the at least one assembly ceiling panel 118A of the plurality of ceiling panels 118 in at least one of higher than the ceiling grid plane 112, lower than the ceiling grid plane 112 and at a tilted angle relative to the ceiling grid plane 112.

The at least one linear support element 102, when in operation, supports the at least one central panel 118A lower than the ceiling grid plane 112. Specifically, the at least one linear support element 102 holds the edges of the at least one assembly ceiling panel 118A in a manner that the position of the at least one assembly ceiling panel 118A is lowered than the ceiling grid plane 112. Furthermore, the position of the at least one ceiling panel 118A that is lower than the ceiling plane 112 can be defined as a condition wherein an axis of abscissas of the at least one ceiling panel is parallel to an axis of abscissas of the ceiling grid plane 112 when measured in a plane cartesian coordinate system. Optionally, the at least one assembly ceiling panel 118A that is lower than the ceiling grid plane 112 includes a height that is less than a height of the ceiling grid plane 112. It will be appreciated that the heights of the at least one assembly ceiling panel 118A and the ceiling grid plane 112 is measured from the floor of the room. For example, the height of the at least one assembly ceiling panel 118A may be 2.25 meters from the floor. In such an example, the at least one linear support element 102 holds, namely supports, the at least one assembly ceiling panel 118A at a height of 2.20 meters from the floor of the room.

The at least one assembly ceiling panel 118A of the plurality of ceiling panels 118, supported by the at least one linear support element 102 is configured (namely arranged when in operation) to provide a three-dimensional appearance to the ceiling grid system 100. The plurality of ceiling panels 118 and the electrically and/or electronically operated ceiling devices are optionally arranged in a manner that their respective positions are higher than the ceiling grid plane 112, lower than the ceiling grid plane 112, or at a tilted angle relative to the ceiling grid plane 112; in such an example, the three-dimensional appearance to the ceiling grid system is achieved. The at least one linear support element 102 accommodates the plurality of ceiling panels 118 and electrically and/or electronically operated ceiling devices in a manner that, when in operation, the ceiling grid system 100 comprises a three-dimensional view when viewed from plurality of locations within the room. It will be appreciated that, the three-dimensional appearance of the ceiling grid system refers to a view, wherein the ceiling grid system appears to include protrusions and indentions in height, weight, and length.

In an embodiment, the at least one linear support element 102 is detachably coupled to the ceiling grid T-Bars 106. Typically, the at least one linear support element 102 forms a detachable coupling with the ceiling grid T-Bars 106, and thus allows a quick and easy replacement of any of the coupled ceiling grid-T-Bars 106 without replacing the entire ceiling grid system 100.

In an embodiment, the at least one linear support element 102 comprises a clip, bracket, or latch to detachably couple with the ceiling grid T-Bars 106. Typically, the clip, bracket or latch of the at least one linear support element 102 is configured to provide the detachable coupling with the T-Bars 106. The ceiling grid lighting assembly of the present disclosure eliminates a need and cost for brackets or other mounting or suspension hardware and does not require any cutting of ceiling panels in the ceiling grid arrangement. The ceiling grid lighting assembly allows to provide for the length of the light fixture that matches the length of the T-Bar, or it could be lesser or greater than the length as desired for aesthetic purposes. Furthermore, the present ceiling grid lighting assembly 101 provides for fixtures of shorter lengths that could be used together to provide a configurable overall length, and further can be used to combine fixtures such as spotlights and wall washers.

As shown in FIG. 1B, the ceiling grid lighting assembly 100 further comprises at least one covering element 132 arranged proximate to the linear support element 102 to conceal (or cover) an opening 134 in the central optical cavity 122. The linear support element 102 is configured to provide support to the covering element 132 for covering and/or concealing the opening 134 formed in the central optical cavity 122. Notably, the at least one covering element 132 is either arranged proximate to or adjacent to the linear support element 102 to be supported thereat or arranged on the linear support element 102 for direct support provision for the at least one covering element 132. Optionally, the at least one covering element 132 may be supported by the ceiling grid T-Bars 106 or the at least one assembly ceiling panel 118A. The term "at least one covering element" refers to a type of object configured to be, or to serve, as a covering of a desired space or object. For example, the at least one covering element 132 is configured to cover at least the opening 134 in the central opening cavity 122. Notably, the at least one covering element 134 does not have a definite shape or size and is varied depending upon the need of the implementation i.e., the shape and size of the openings 134 present in the ceiling grid system. Generally, the shape and size of the at least one covering element 132 is equal to the size and shape of the opening 134; However, the size and shape of the at least one covering element 132 may be different from the size and shape of the opening 134, namely the size may be larger or smaller than the opening 134 to cover the opening 134 entirely or partially, respectively. Moreover, in case of a larger size of the at least one covering element 132, it may extend to the other nearby ceiling elements to provide increased coverage and protection. Typically, whenever the at least one linear support element 102 is implemented within the ceiling grid system, to either, lower, raise or tilt the at least one assembly ceiling panel 118A with respect to the ceiling grid plane 112, the opening 134 in the central optical cavity 122 is formed. However, the opening 134 may be formed in other manners as well without limiting the scope of the disclosure. However, such openings 134 are not preferred since it allows the bare ceiling grid array 104 and the ceiling grid T-Bars 106 to be seen (by an observer on the ground) and provides an unaesthetic and/or un-appeasing look to the ceiling grid system 100. Further, such openings 134, gaps or holes reduce the structural integrity of the ceiling grid system 100. Moreover, the opening 134 may also result in collection of dust-particles and other contaminants entering via the opening 134. Thus, to overcome the aforementioned problem, the ceiling grid lighting assembly 100 further comprises the at least one covering element 132 to conceal the opening 134 in the central optical cavity 122 to beneficially provide a monotonous, aesthetically appeasing look and at the same time increases the structural integrity of the ceiling grid system and/or the ceiling grid lighting assembly 100. Optionally, the covering element 132 may also enable an air-tight formation of the ceiling grid system and/or the ceiling grid lighting assembly 100 that does not allow air to pass through and prevent flow of dust particles therein.

In an embodiment, the opening 134 in the central optical cavity 122 is configured by a gap 136 between the assembly ceiling panel 118A and the surrounding ceiling panels 117B or the assembly ceiling panel 118A and a ceiling mount. Typically, the opening 134 in the central optical cavity 122 is formed when the location and/or orientation of the assembly ceiling panel 118A is varied with respect to the ceiling grid plane 112 and wherein, the opening 134 is configured by the gap 136 between the at least one assembly ceiling panel 118A and the surrounding ceiling panels 117B or the at least one assembly ceiling panel 118A and a ceiling mount. The gap 136 is formed (as visible by an observer on the ground) between two neighboring ceiling elements and is required to be covered using the at least one covering element 132. Specifically, the gap 136 defines the shape and size of the covering element 132 such that the covering element 132 completely covers the opening 134 in the central cavity 122 and does not leave any holes, gaps or openings in the ceiling grid system. The "ceiling mount" refers to different types of mountings applied to the structural ceiling 116 instead of the conventional ceiling panel for a desired functioning and operation of the ceiling grid system. The ceiling mount may be replaced instead of the assembly ceiling panel 118A using one of a decorative mount, a functional mount, or a mounting device and the like depending upon the implementation. For example, the ceiling mount may be a decorative tile, an exhaust or intake vent, a ceiling fan, a ceiling air conditioner, a ceiling glass and the like to at least cover the opening 134 in the central optical cavity 122 and optionally, at the same time, perform other desired operations.

In an embodiment, the least one covering element 132 is configured to have a size conforming to a shape of the gap 136 or bigger than the gap 136. Generally, the shape and size of the covering element 132 is bigger than the gap 136 to effectively cover the opening 134 and provide the desired aesthetic look as a result. The bigger size of the at least one covering element 132 enables other ceiling elements such as, the light source, the optical element or other utility components, to be supported by the at least one covering element. Moreover, an extended portion i.e., the portion of the at least one member left after covering the opening 134 in the central optical cavity may comprise a different material and/or property with respect to the portion of the at least one covering element 132 conforming to the shape of the gap 136, such that the extended portion may provide an improved design or increase the optical characteristics of the optical element light distribution 130.

Optionally, the at least one covering element 132 is configured to have a size smaller than the gap 136 such that the opening 134 or the gap 136 is only partially covered such that a space for implementing another ceiling element or device may be provided and also to enable ventilation in the room containing the ceiling grid system.

In an embodiment, the at least one covering element 132 is integral with the linear support element 102 or detachably coupled to the linear support element 102. The at least one cover member 132 is formed integrally with linear support element 102 such that the at least one covering element 132 is formed integrally with the linear support element i.e., forms a common element configured to cover the opening 134 in the central optical cavity 122 and at the same time support the at least one central panel 118A thereon. Such an integral arrangement increases the structural integrity and robustness of the ceiling grid system, reduces the installation time and thus, enables a quick setup and maintenance of the ceiling grid system and ceiling elements therein. Moreover, optionally, the at least one covering element 132 is detachably coupled to the linear support element 102. Typically, the at least one linear support element 102 forms a detachable coupling with the ceiling grid T-Bars 106, and thus allows easy replacement of any of the coupled ceiling grid-T-Bars 106 without replacing the entire ceiling grid system. Moreover, such a detachable arrangement allows for a quick and cost-effective replacement process and removes the need for replacing the entire ceiling grid lighting assembly 100.

In an embodiment, the at least one covering element 132 is arranged proximate to the linear support element 102 at an angle perpendicular or oblique to the ceiling grid plane 112. Typically, the at least one covering element 132 may be arranged and oriented with respect to the ceiling grid plane based on the need of the implementation proximate to the linear support element to effectively cover the opening 134 in the central cavity 122. Herein, the at least one covering element 132 is located perpendicular or oblique to the ceiling grid plane 112 such that the opening 134 formed due to lowering, raising, or tilting of the at least one assembly ceiling panel 118A via the linear support element 102 is effectively covered. However, it will be appreciated that the size, orientation, and placement of the at least one covering element 132 is changed without limiting the scope of the disclosure. For example, the at least one covering element 132 is arranged parallel to the ceiling grid plane 112. Notably, the placement and orientation of the at least one covering element 132 is beneficially varied to improve the optical element light distribution 130 via the light assembly 102 such as by providing the at least one covering element 132 having one or more optical properties such as, reflection or specular reflection properties such that the optical element light distribution 130 may be focused or spread across the room containing the ceiling grid system.

In an embodiment, the at least one covering element 132 includes a planer shape, an arcuate shape or any combination thereof. Typically, the shape of the gap 136 defines the shape and size of the opening 134 in the central optical cavity 122 and thus, to effectively cover the opening 134, the at least one covering element 132 includes multiple shapes and sizes comprising a planar shape (such as a quadrilateral shape, a triangular shape or any other polygonal shape), an arcuate shape (such as, a circular shape, a semi-circular shape, paraboloid shape, a hyperboloid shape and the like), any other curved shape that may be formed by the combination of two or more of the following shapes. The arcuate configuration comprises any curved shape that may or may not be irregular and/or symmetrical, wherein the arcuate shape and size of the at least one covering element 132 is defined by the gap 136. Additionally, optionally, the at least one covering element 132 comprises one or more patterns and/or protrusions on its surface. Such protrusions and patterns are designed in a manner so as to provide an improvised look to the ceiling grid system or the ceiling grid lighting assembly 100 and at the same time provide options to the user for selection of the covering element 132 apart from the conventional size, shape and material considerations.

In an embodiment, the at least one covering element 132 comprises at least one of an optical property of refraction, absorption, diffusion, reflection or scattering of the incident light. Typically, the at least one covering element 132 may be used in conjunction with other elements such as, the printed circuit board 1106, the optical element 304 and so forth; and thus, may be required to inhibit an optical property to beneficially provide a desired illumination therein. The optical property is at least one of refraction, absorption, diffusion, reflection or scattering of the light and wherein one or more of the optical properties of the at least one covering element 132 may be used in conjunction with other ceiling elements as per the need of the implementation. Optionally, the at least one covering element 132 comprises a reflective surface i.e., a surface capable of reflecting incident light, wherein the reflective surface comprises one of an optical property. Notably, the at least one covering element 132 may comprise more than one optical property. For example, the at least one covering element 132 may comprise the optical properties diffusing, scattering, and redirecting light i.e., the at least one covering element 132 is enabled to diffuse and/or redirect incident light. Optionally, the at least one covering element 132 comprises the reflective surface, wherein the reflective surface comprises at least one of a colored surface, a textured surface. For example, the reflective surface of the covering element 132 comprises a blue-colored surface. In another example, the reflective surface of the at least one covering element 132 comprises an angularly textured surface (such as, a surface that is configured to reflect light only when the light is incident thereon at specific angles. Optionally, such reflective surfaces are configured to reflect the light such that the light is scattered at different angles therefrom). It will be appreciated that such reflection and scattering of the incident of light in different colors and along different paths, enables to provide an aesthetically appealing ambiance within a room wherein the ceiling grid system is installed. Furthermore, such a reflection of the incident light that may be emitted from natural sources, reduces a requirement for providing artificial light within the room, thereby, allowing to reduce energy consumption (and consequently, cost thereof) for lighting purposes within the room. Optionally, the covering element 132 comprises a textured surface, wherein the textured surface comprises at least one of: a light-diffusing surface, a specular surface, and/or angularly textured surface. Optionally, the covering element 132 comprises one or more protrusions thereon that may be used for an aesthetic appeal or for providing further reflection to the incoming light in multiple directions.

In an embodiment, the least one covering element 132 is one of a standard ceiling panel, an acoustic ceiling panel, a decorative tile, a planar reflective panel or a non-planar reflective panel. Typically, the at least one covering element 132 is formed using at least a portion of the standard ceiling panel, wherein the portion of the standard ceiling panel is shaped, and size based on the gap 136 and/or the opening 134. Further, the at least one covering element 132 may be formed using the acoustic ceiling panel that are placed and oriented strategically to improve overall light and sound quality, eliminate or at least reduce the residual sounds, act as absorbers and diffusers of sound and/or light for improving sound intelligibility. Furthermore, the at least one covering element 132 may be formed using a reflective or non-reflective panel depending upon the implementation i.e., the at least one covering element 132 may further reflect light to improve the optical element light distribution 130 or may not reflect light to prevent unwanted optical element light distribution 130 or to configure the optical element light distribution 130 via the placement and orientation of the at least one covering element 132.

In an embodiment, the least one covering element 132 is made of plastic, metal, glass, rubber, paper, wood or any combination thereof. The at least one covering element 132 can be made from a variety of materials depending upon the need of the implementation. For example, the at least one covering element 132 may be formed using a plastic (that comprises one or more polymers therein) such as PET, PVC and the like, a metal or a metal alloy such as iron, steel, aluminum, copper and the like, a glass such as, a transparent or see-through glass, a designer glass, an opaque glass and the like, a rubber such as neoprene rubber, silicon rubber, nitrile rubber, fluorosilicone rubber and the like, a wood such as, softwood or hardwood or any combination thereof to provide a sturdy and robust covering element 132 or a flexible covering element. Furthermore, the covering element 132 may incorporate additional features to enable it to be connected to the linear support element or the T-Bar. The covering element 132 might also have features, such as tabs or holes, that may enable it to be attached to a cable or wire and suspended from the structural ceiling.

In an embodiment, the ceiling grid lighting assembly 100 further comprising a utility component 128, supported by the at least one covering element 132, selected from a group consisting of an alarm, a sensor, a ventilation fan, a heater, a humidifier, an electronic controller, a battery, a wireless communication module. Typically, apart from the at least one linear support element 102, the at least one covering element 132 is also configured to support the utility component 128 therein. Notably, the utility component 128 may be located either at a back side (or invisible side) of the ceiling grid system, such that after inclusion of the at least one covering element 132, the utility component 128 is beneficially hidden by the at least one covering element 132 or on a front side (or visible side) to effectively support the utility component 128 thereon. Such an arrangement i.e., at the back side of the covering element 132 provides a continuous and aesthetically pleasing look to the ceiling grid system 100 or at the front side to provide additional functionalities to the ceiling grid lighting assembly or the ceiling grid system 100. Optionally, the sensors of the utility component 128 comprises one or more of: a smoke-detector, a proximity sensor, a light sensor, a motion sensor, and a combination thereof. In an example, there is provided a house with a multilevel security arrangement including multiple combinations of utility components 128 implemented within the ceiling grid lighting assembly 100. In the same example, other utility components 128 may also be used in the multilevel security arrangement such as the smoke-detectors may be used to provide an alarm when a fire or burning happens in the house. In another example, proximity sensors and motion sensors are used to detect strangers or movements of objects. In yet another example, light sensors may be used to detect lighting conditions such as ambient light and control the light sources accordingly.

Figure 2:
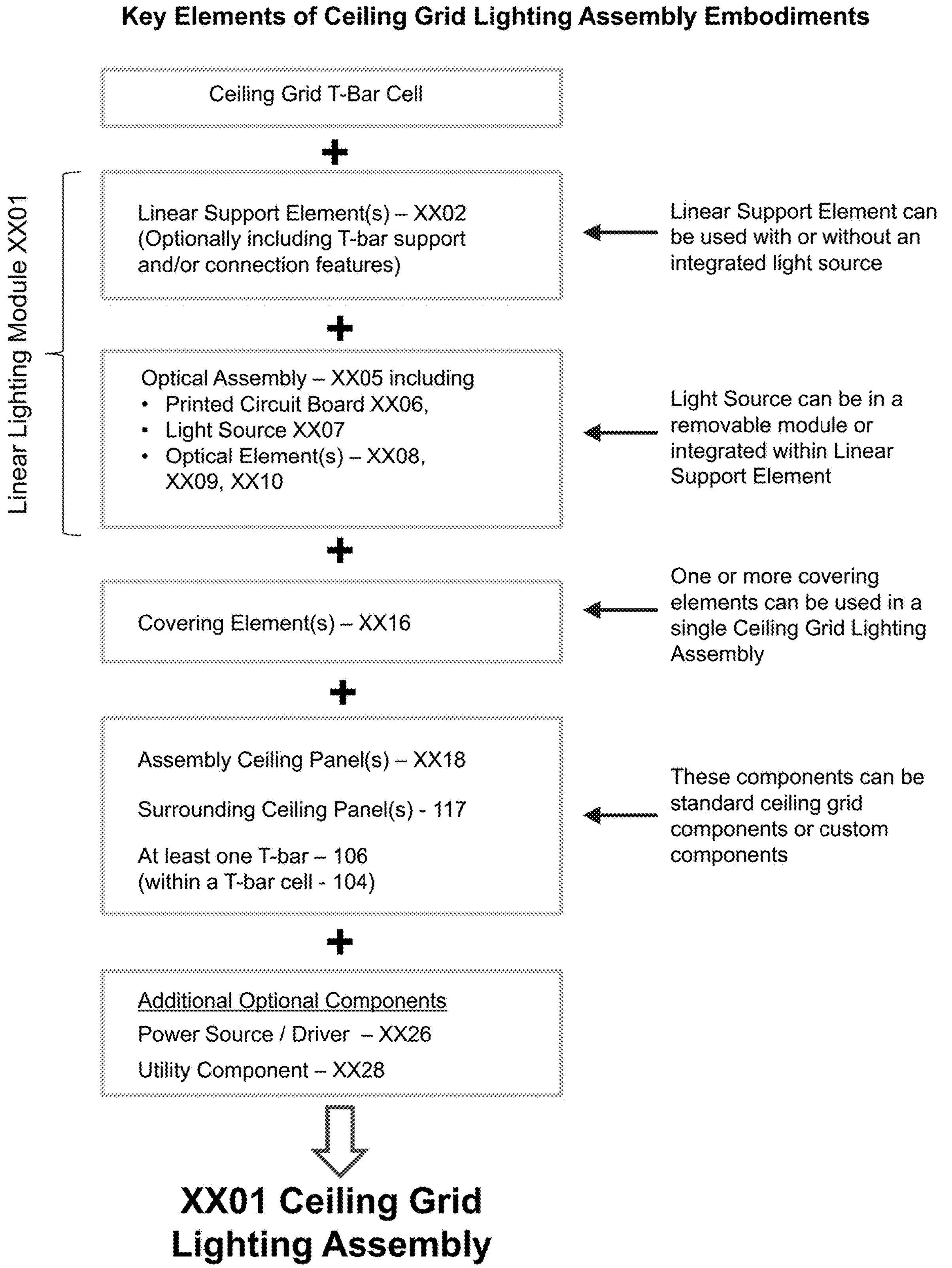
FIG. 2 details the key elements of ceiling grid lighting assembly embodiments.

FIG. 2 is a diagram of key elements of ceiling grid lighting assembly embodiments A-K illustrated in FIGS. 3-13. Assembly ceiling panels, surrounding ceiling panels, and ceiling grid T-Bars are components that can be standard ceiling grid components or custom versions. Linear support elements, light sources, and optical elements are key components that can be assembled as individual components or integrated into linear support element which can be selectively fabricated to length to fit particular ceiling grid sizes and shapes.

FIGS. 3-10 are illustrations of exemplary implementations of lighting assemblies within a ceiling grid system, in accordance with various embodiments of the present disclosure. For each of the FIGS. 3-10, the "A" version figure is an open or un-covered view and the "B" version is a view with covering element in place. Typically, there will be one or more linear lighting modules each comprising a linear support element with integrated optical assembly and one or more covering elements typically on opposing sides of the assembly but with the cross-section view only the front facing covering element is visible and illustrated.

Figure 3A:
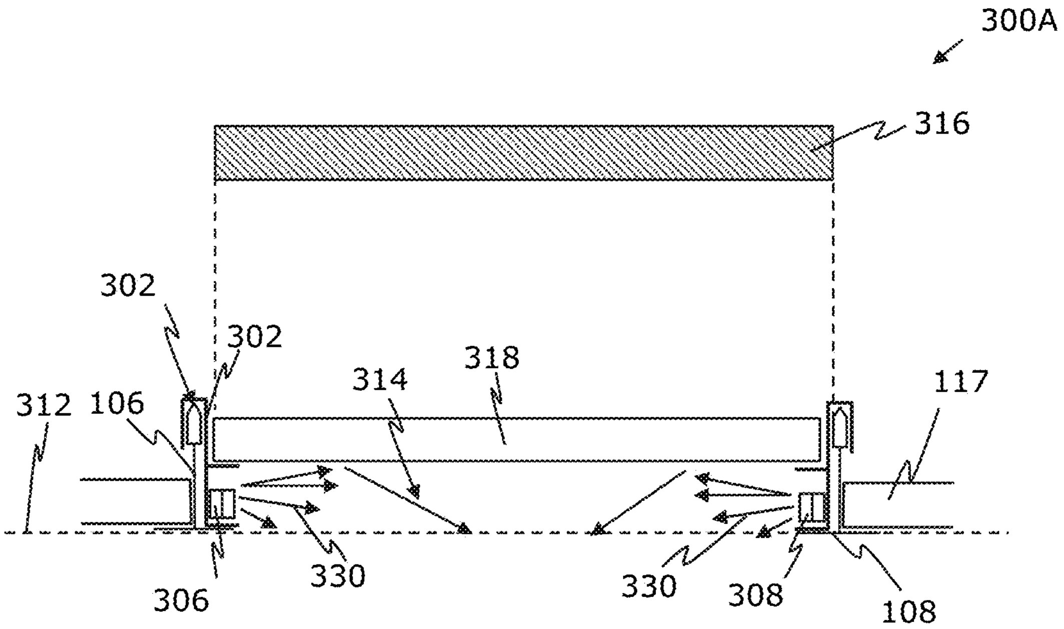
FIGS. 3A-3B are cross section views illustrating variations of ceiling grid lighting assembly embodiment A.
Figure 3B:
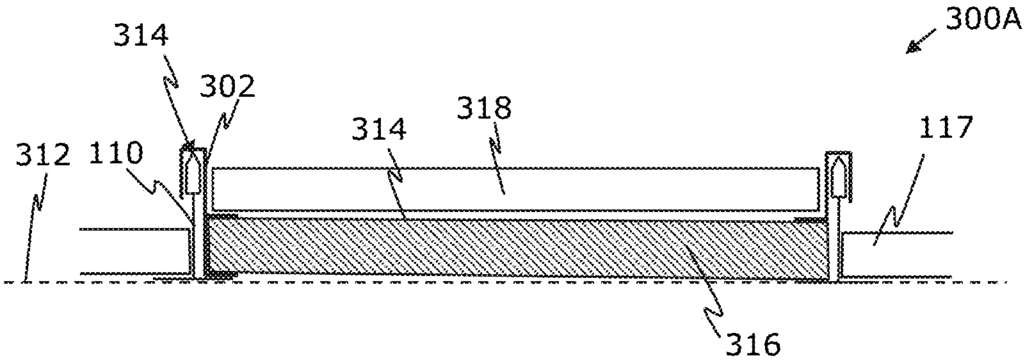

FIGS. 3A-3B are cross section views illustrating variations of ceiling grid lighting assembly embodiment 300A within a suspended ceiling grid system wherein the ceiling grid lighting assembly 300A comprises at least one T-Bar cell within the T-Bar cell array 104 that provides structural integrity to the ceiling grid lighting assembly 301. FIG. 3A and FIG. 3B illustrate the ceiling grid lighting assembly with and without the covering element 316 in place. FIG. 3A shows the covering element 316 removed and separately positioned above the assembly while FIG. 3B shows the covering element positioned in place as part of the embodiment 301A lighting assembly wherein it functions to form an enclosing wall of the optical cavity which prevents light from projecting into the ceiling plenum and aids in forming the light distribution that projects out of the optical cavity. Although not visible and shown in the cross-section views of FIGS. 3A-D, there is typically an additional covering element in place on the opposite side of the central optical cavity from the shown covering element 316. In embodiment 300A, the optical cavity is bounded by the assembly ceiling panel 318, covering elements 316, and the linear support element 302. The ceiling panel 318 of embodiment 300A ceiling grid lighting assembly is held horizontally by linear support elements 302 on two opposing edges and raised above the ceiling plane 312. In such an arrangement it is positioned to create a recessed central optical cavity 322 into which a portion of optical element light distributions 330 are projected from optical elements 308 which propagate light form light sources 306. Parenthetically, the printed circuit board 306 (with light source) and optical element 308 are configured to project light into and out from the optical cavity 314. As illustrated, a portion of the light from the light source illuminates the underside of the assembly ceiling panel 318 and a portion is directed below the ceiling grid plane 112 into the room below. As illustrated in FIG. 3A-3B, the assembly ceiling panel 318 is illustrative of a standard ceiling panel size and type but alternative embodiments can be configured with panels of different size or type. The ceiling panel 318 is held in position by a external support features of the linear support element 302 which also supports the printed circuit board 306 (with light source) and optical elements 308 by internal support features. As illustrated, a portion of the light 314 from the light source illuminates the underside of the assembly ceiling panel 318 and a portion 330 is directed below the ceiling grid plane 112 into the room below. In contrast to the assembly ceiling panel 318, the surrounding ceiling panels 117 are mounted in a conventional manner wherein the bottom surfaces of the surrounding ceiling panels 117 are resting on horizontal portions 108 of T-Bars 106 at level with the ceiling grid plane 312.

Figure 3C:
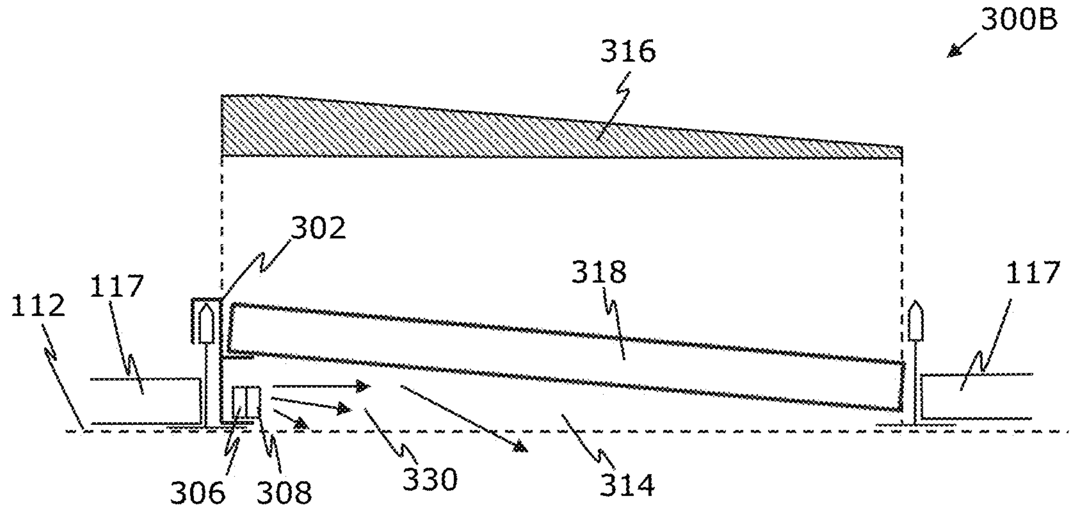
FIGS. 3C-3D are cross section views illustrating variations of ceiling grid lighting assembly embodiment B.
Figure 3D:
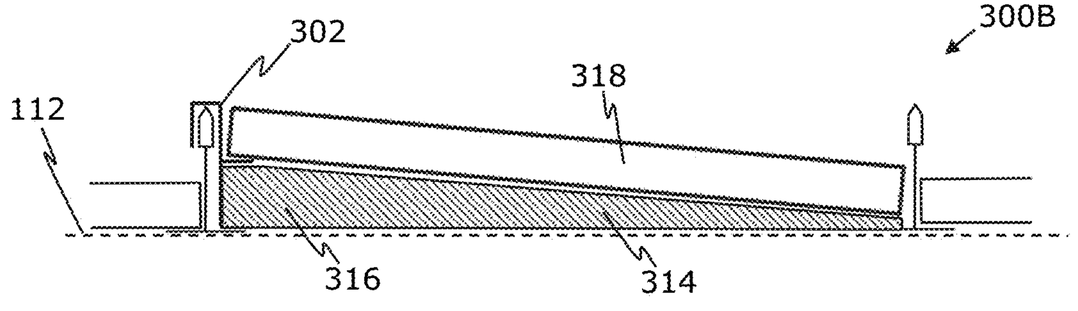

FIGS. 3C and 3D show embodiment 300B and illustrate specific details of ceiling grid lighting assembly 300B comprising an embodiment linear support element 302 that is configured to both mount on a T-Bar and support the edge of a ceiling panel 318 at an elevation and tilt relative to the ceiling grid plane 112. The optical element 308C is a vertically oriented edge lit diffuser configured to emit into the optical cavity and in FIG. 3C only the top mounting portion of the linear support element 302 extends minimally over the T-Bar on which it is mounted in longitudinal alignment. In FIG. 3D the ceiling grid lighting assembly 300B is illustrated with a covering element 316 in place. the linear support element 302 is configured with features of both a supporting element and a T-Bar and in this case there is no extension of components about the top of the integrated support element/T-Bar component 302D. Additionally, the linear support element 302D is configured to support a driver 326 which is positioned in an adjacent T-Bar cell within the ceiling grid system, thereby eliminating a need to position the driver 326 in the plenum space above the minimum plenum plane 351.

Figure 3E:
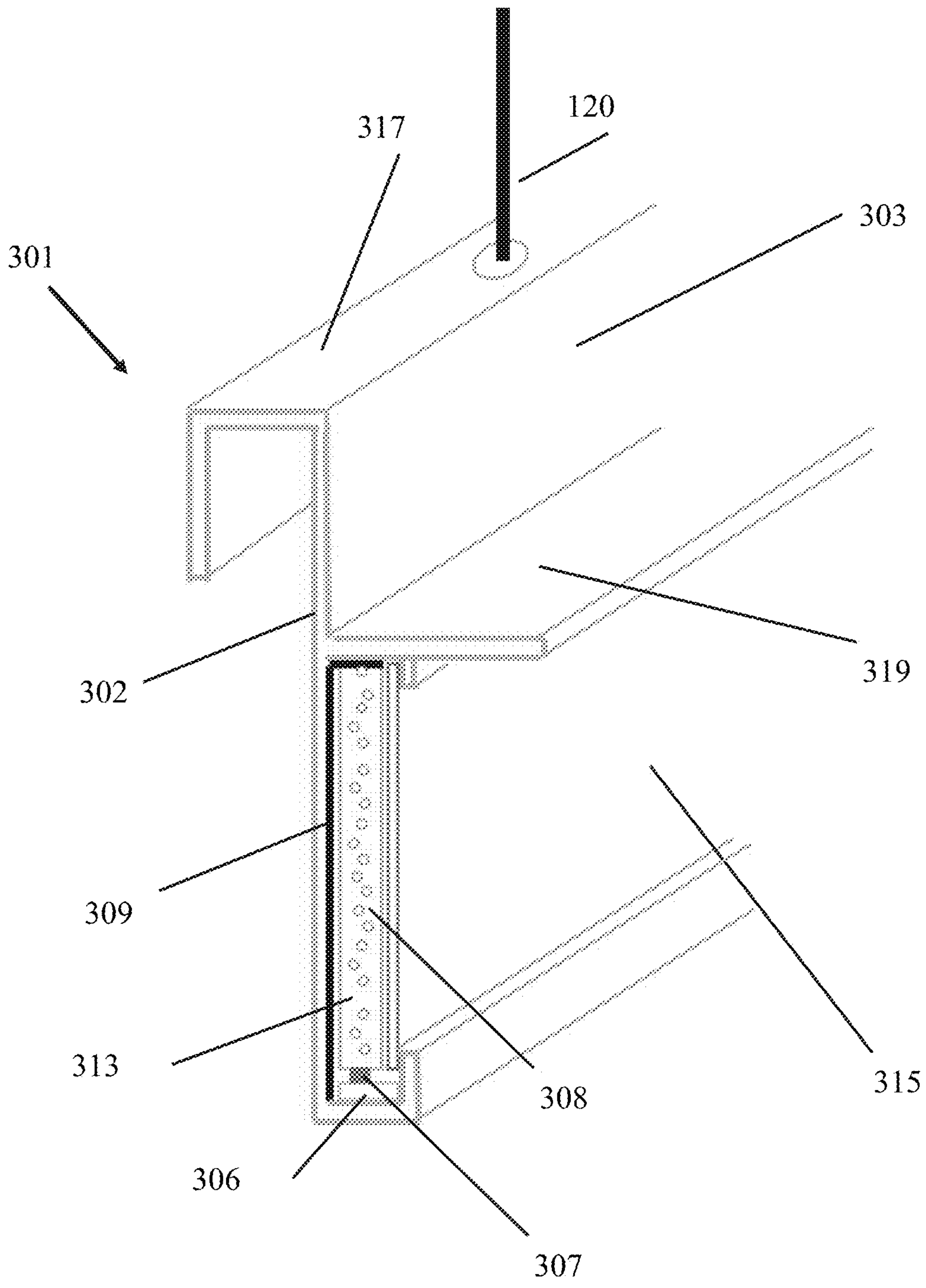
FIG. 3E is a cross section view of an embodiment linear lighting module used in lighting assembly embodiments A and B and its associated components including linear support element, optical element, and LED board.

FIG. 3E is a cross sectional view of an embodiment of a linear lighting module 301 used in ceiling grid lighting assemblies 300A and 300B and incorporating a linear support element 302 that mounts onto a T-Bar using a mounting section 317 incorporated into the elongate profile design that fits over the longitudinal length of a T-Bar vertical leg. The linear support element 302 further comprises an edge-lit optical element 308 such as a light guide or low clarity diffuser with a region containing internal light scattering particles 313, a reflector 309 and a secondary optical element 315 such as a light shaping diffuser. The linear support element 302 further comprises a ledge 319 on which a ceiling tile can be supported and the linear support element 302 can be securely attached to the structural ceiling by using a suspension cable or wire that is typically attached to a bracket or through a hole in its elongate body.

Figure 4A:
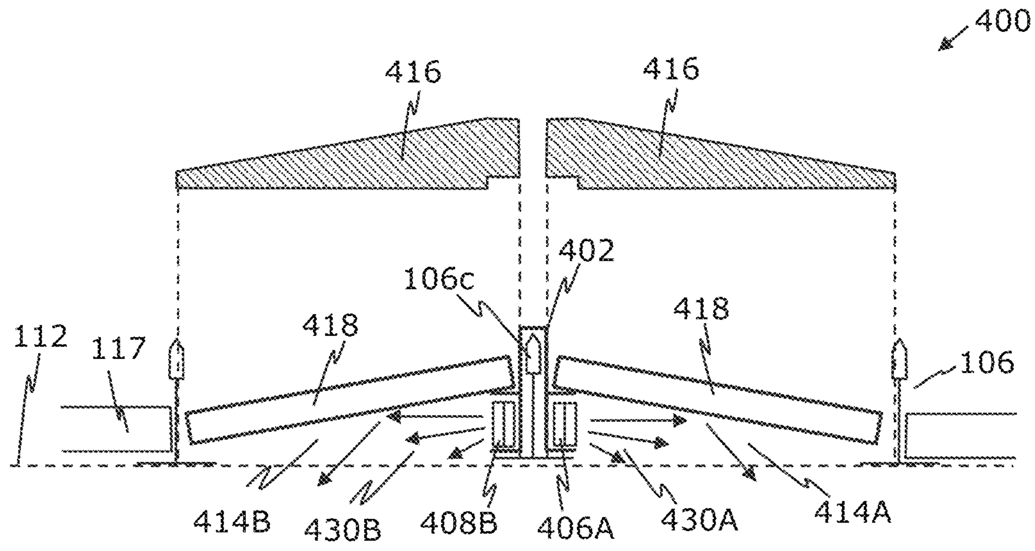
FIGS. 4A-4B are cross section views illustrating variations of ceiling grid lighting assembly embodiment C.
Figure 4B:
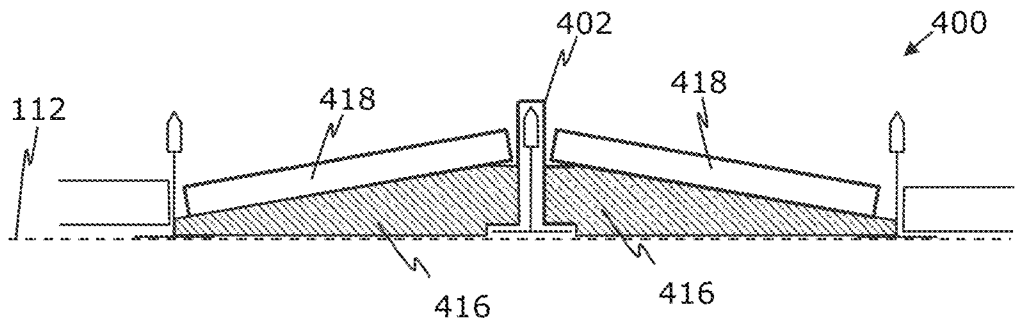

FIGS. 4A-4B are cross section views illustrating ceiling grid lighting assembly embodiment 400 wherein two ceiling panels 418 are supported by the same linear support element 402 on either side of the vertical portion of a T-Bar. Furthermore the two ceiling panels 418 are inclined with respect to the ceiling grid plane 112. In this case the ceiling grid assembly 400 also spans two ceiling grid T-Bar cells through the use of a linear support element 402 which straddles a central T-Bar 106*c*. The linear support element 402 positions printed circuit boards 406A and 406B (with light sources) and optical elements 408A and 408B on opposing sides of the central T-Bar 106*c* such that they produce optical element light distributions 430A and 430B that emit into respective optical cavity portions 414A and 414B and reflect off the ceiling panels 404 but in opposite outward directions. As illustrated, a portion of the light from the light source illuminates the underside of the assembly ceiling panel 418 and a portion is directed below the ceiling grid plane 112 into the room below. FIG. 4A shows two covering elements 416 positioned removed and above the ceiling grid lighting assembly 400 while FIG. 4B shows the covering element 416 in assembled position. The ceiling grid lighting assembly embodiment D can be used as a useful alternative to a typical 2×4 troffer style fixture. The tilted ceiling panels 404 provide a low glare and diffuse illuminated surface when viewed from the room below and the covering elements 416 positioned at each of the linear support element provide further reflected light.

Figure 4C:
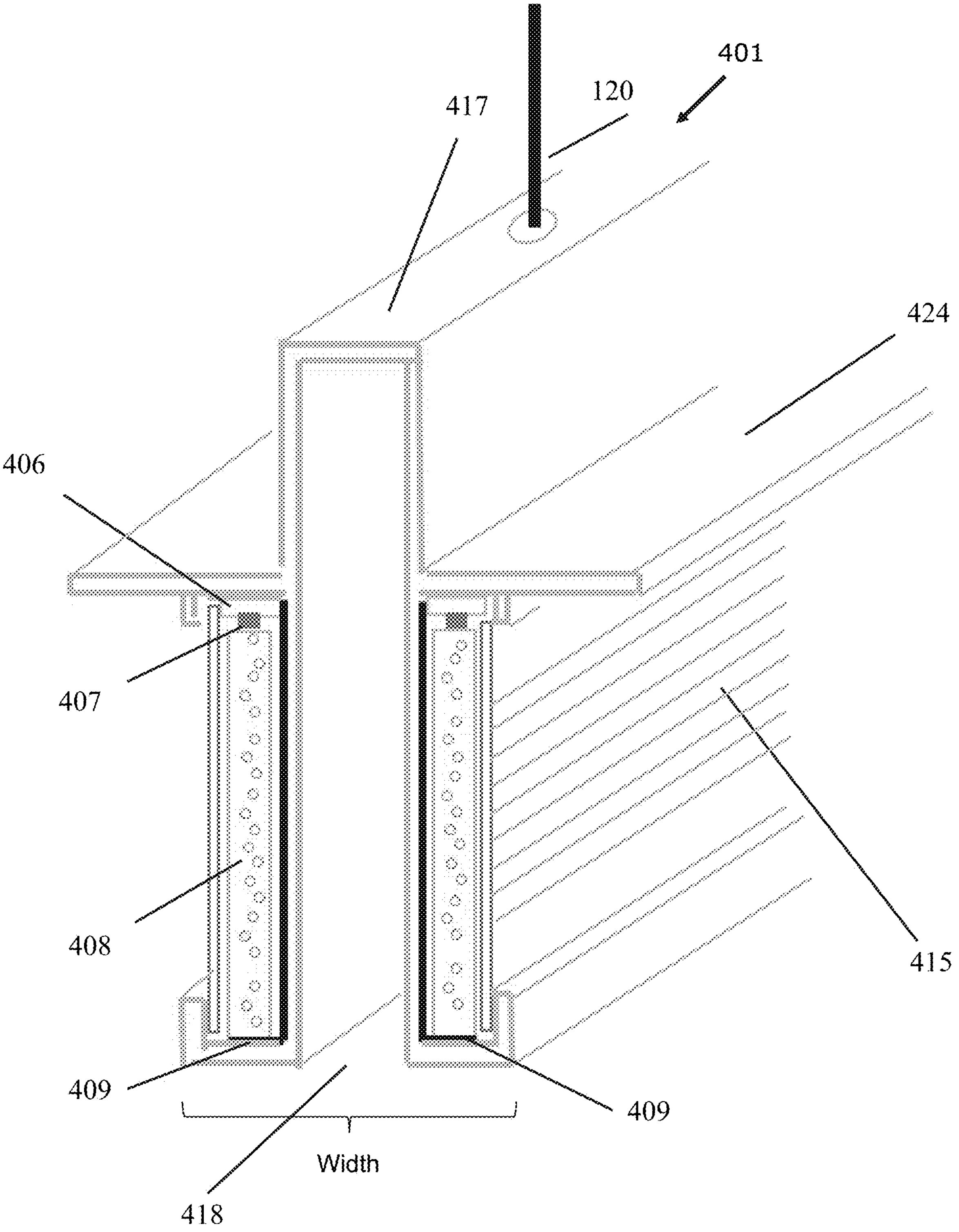
FIG. 4C is a cross section view of an embodiment linear support element used in lighting assembly embodiments C and its associated components such as linear support element, optical element, and LED board.

FIG. 4C shows detail of a linear lighting module 401 used in the ceiling grid lighting assembly 400. In FIG. 4C the linear support element 402 is positioned on either side of the vertical portion of a T-Bar and supports and aligns one or more LED light sources 407 mounted onto a printed circuit board 406 inputting light into the edge of an optical element 408 that is a vertically oriented edgelit diffuser. The linear support element 402 further supports a reflector 409 behind the edgelit optical element and an optically transmissive component 415 proximate to its outer face which in turn acts as the outer face of the linear lighting module 401. In this type of configuration, a light source could be positioned on either or both edges of the edgelit diffuser and controlled independently to produce differing light distributions. FIG. 4C also shows a linear support element 402 that mounts over a T-Bar and, when mounted, supports a light source on either side of the vertical leg of the T-Bar and also incorporates ceiling panel support features 424 to further support the edge of a ceiling panel on either side of the T-Bar. In the embodiment the optical assemblies comprise an optical element 408 that could be an edge-lit low clarity diffuser or light guide. The width of the linear support element 402 is also configured to match the width of the horizontal portion of the T-Bar such that when it is mounted on said T-Bar there is minimal overlap of the linear support element. The width chosen is typically 1.5", 15/16" or 9/16" wide which matches the typical widths of a main beam or cross tee T-bar. The linear support element 402 can further be configured to attach to a suspension cable 120 which in turn would be attached to the structural ceiling. In this manner the linear support element is configured to be part of the structural design of the ceiling grid assembly and could be configured to support other T-Bars as well as ceiling panels.

Figure 5A:
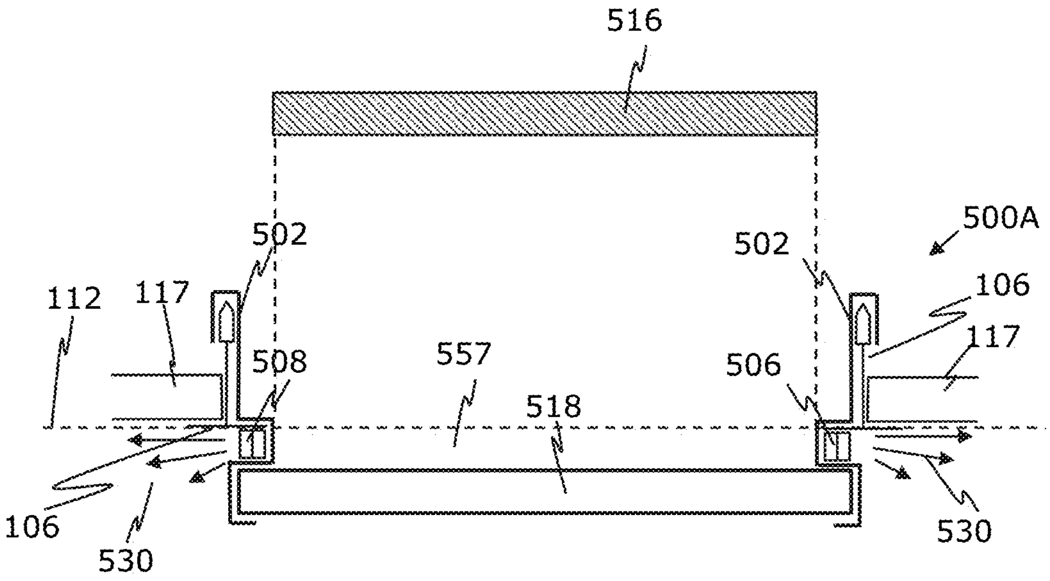
FIGS. 5A-5B are cross section views illustrating variations of ceiling grid lighting assembly embodiment E.
Figure 5B:
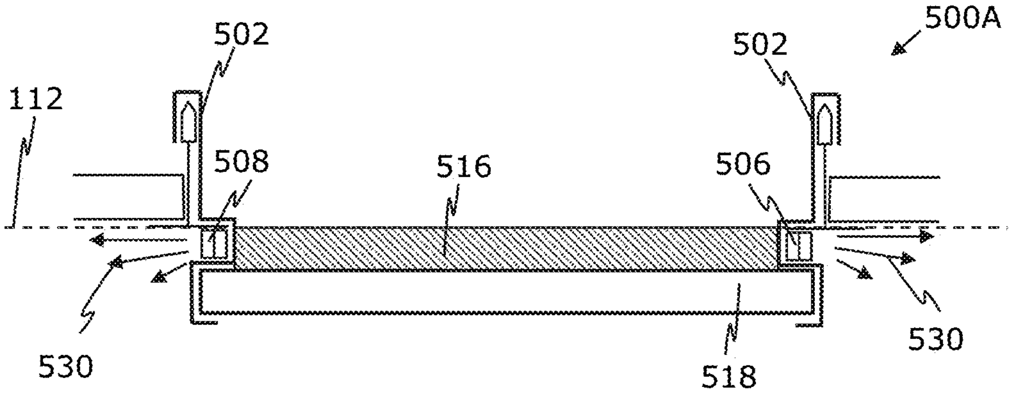

FIGS. 5A-5B views illustrating variations of ceiling grid lighting assembly embodiment 500A within a suspended ceiling grid system wherein the ceiling panel 518 is supported along its edges at a height that is below the ceiling grid plane 112. In embodiment 500A there is no central optical cavity. LED light source 507 mounted on a printed circuit board 506, and optical element 508 are positioned on the exterior side of a non-optical ceiling cavity 557 formed by positioning of the assembly ceiling panel 518 below the ceiling grid plane and below the optical elements 508. The assembly ceiling panel 518, covering elements 516, and linear support elements 502 are enclosing faces of the non-optical ceiling cavity 557. The optical elements 508 project the optical element light distribution away from the non-optical ceiling cavity 557 and partially onto the surrounding ceiling panels 117. Depending on specific configuration, other portions of the optical element light distribution are projected directly downward into the room space below and/or reflected off of the linear support element 502 or T-Bar bottom surfaces.

Figure 5C:
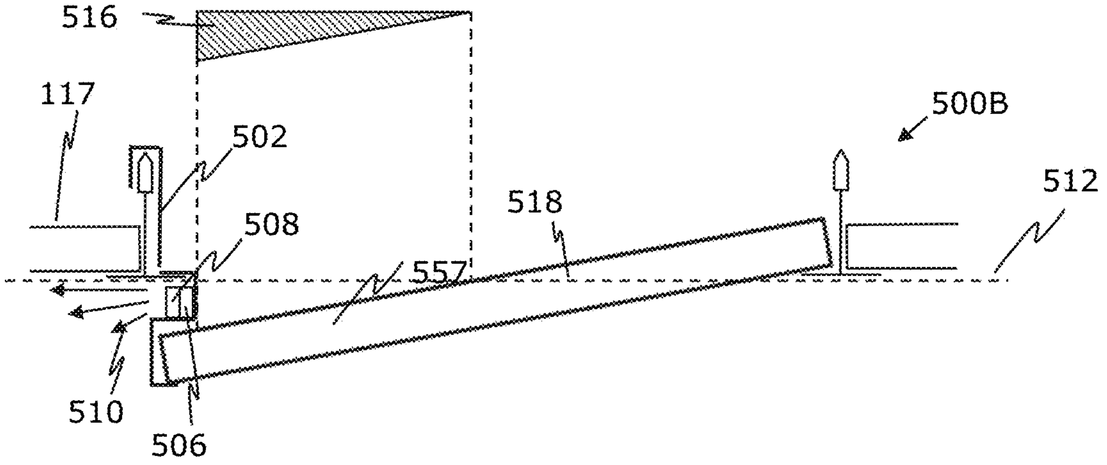
FIGS. 5C-5D are cross section views illustrating variations of ceiling grid lighting assembly embodiment F.
Figure 5D:
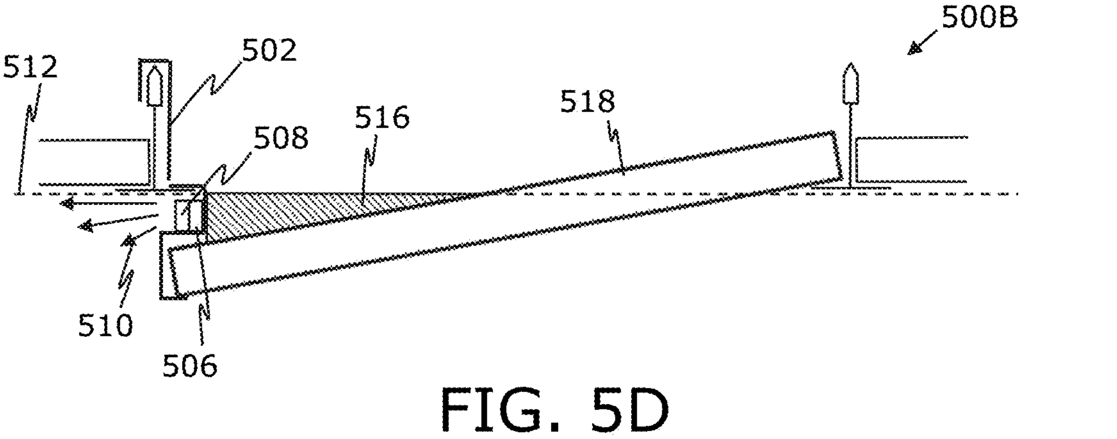

FIGS. 5C-5D are cross-section views of ceiling grid lighting assembly 500B with and without covering element 516 positioned in place as a side wall enclosure of the non-optical cavity 557. The assembly ceiling panel 518 is positioned at an inclined angle and with one edge at a lower elevation with respect to the ceiling grid plane 112 by the use of the linear support element 502. Without the covering element it would be possible to see behind the ceiling panel 518 and into the plenum space. Correspondingly, the covering element 516 has a wedge shape in order to order to cover the triangular/wedge shape opening created by the tilted and partially lowered assembly ceiling panel 518. Optionally, the tilted angle is typically in a range of 10° to 30° with respect to the ceiling grid plane 512. In this embodiment LED light source 507 mounted on a printed circuit board 506 and optical element 508 are configured to project a portion of the optical element light distribution 530 away from the central non-optical cavity and partially onto a surrounding ceiling panel 517. Depending on specific configuration, other portions of the optical element light distribution are projected directly downward into the room space below and/or reflected off of the linear support element 502 or T-Bar bottom surfaces.

Figure 5E:
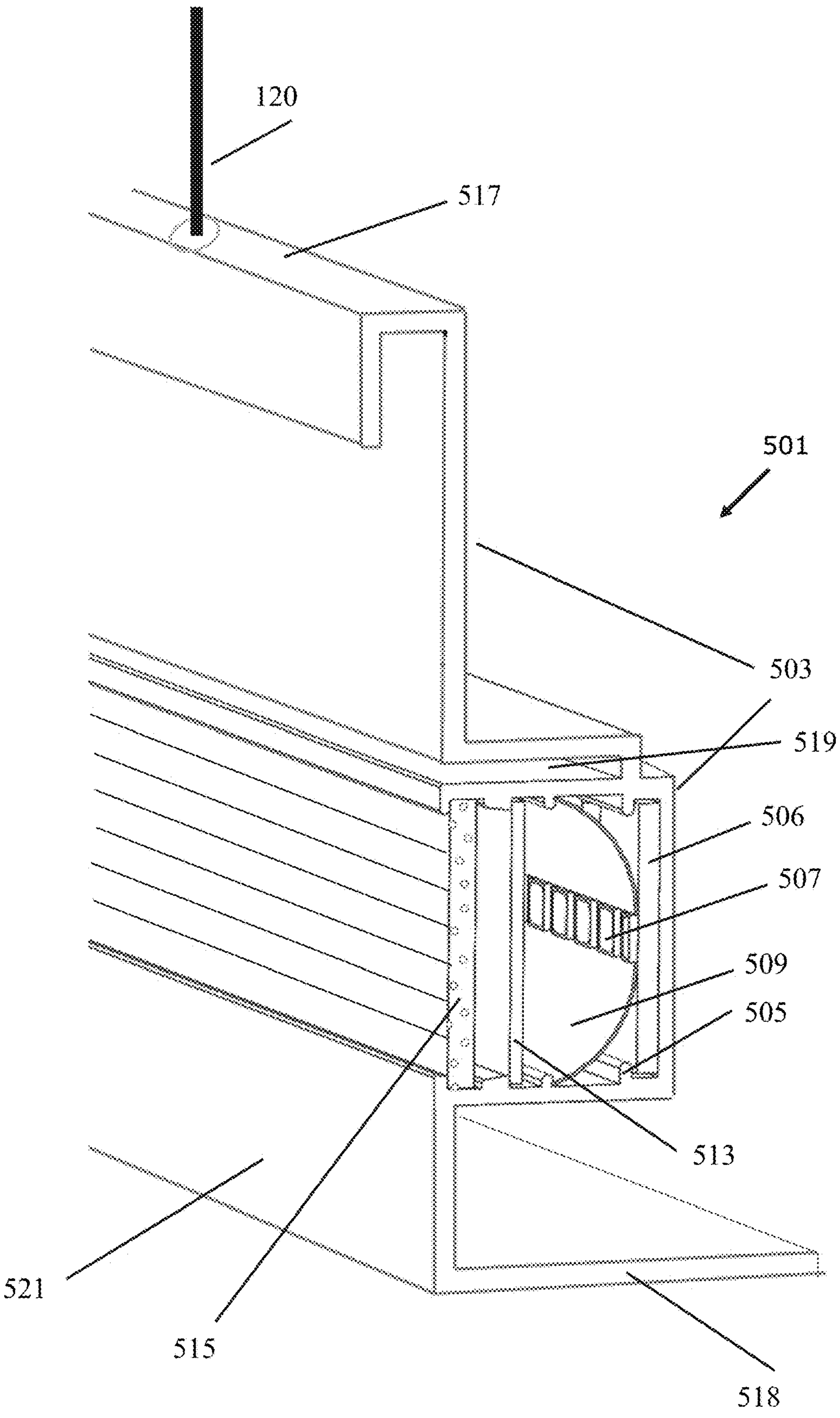
FIG. 5E is a cross section view of a linear lighting module used in lighting assembly embodiments E and F and its associated components including linear support element, optical element, and LED board.

FIG. 5E details an embodiment direct lit linear lighting module 501 configured for use in ceiling grid lighting assembly 500A and 500B. The lighting module is further configured for a uniform appearance and beam control and comprises linear support element 502 configured to support and align LED light sources 507 are mounted on a printed circuit Board 506 which is fitted into the elongate housing 503A with the aid of internal support features such as positioning tabs 505 which create slots within which to position and retain the LED board. Other components supported and retained in position include a reflector 511, a first lens 513, and a second lens 515. In this embodiment, positioning tabs support and retain all components in positions of optical alignment with the LED Light sources to provide optimal configuration for light distribution and appearance uniformity. The reflector 509 functions to efficiently direct light out of the housing. The first lens 513 and second lens 515 can each be configured to contain bulk and/or surface features to provide one or more functions of diffusing, collimating, or redirecting light. Fresnel lenses are particularly useful in collimating and/or tilting beam patterns. Other embodiments may have more or fewer lenses (including no lenses) though which light is transmitted. In applications where a support element is mounted under the ceiling plane and projects onto a surrounding ceiling panel a light distribution commonly known as "wall grazing" or "wall washing" can be re-purposed with the ceiling instead of a wall as the illumination target area. This is represented by the ceiling grazing light distribution polar plot 530 wherein the darker lobe on the polar plot is representative of the axis aligned with the cross-sectional plane and the lighter shading is representative of an axis aligned longitudinally with linear support element.

Figure 5F:
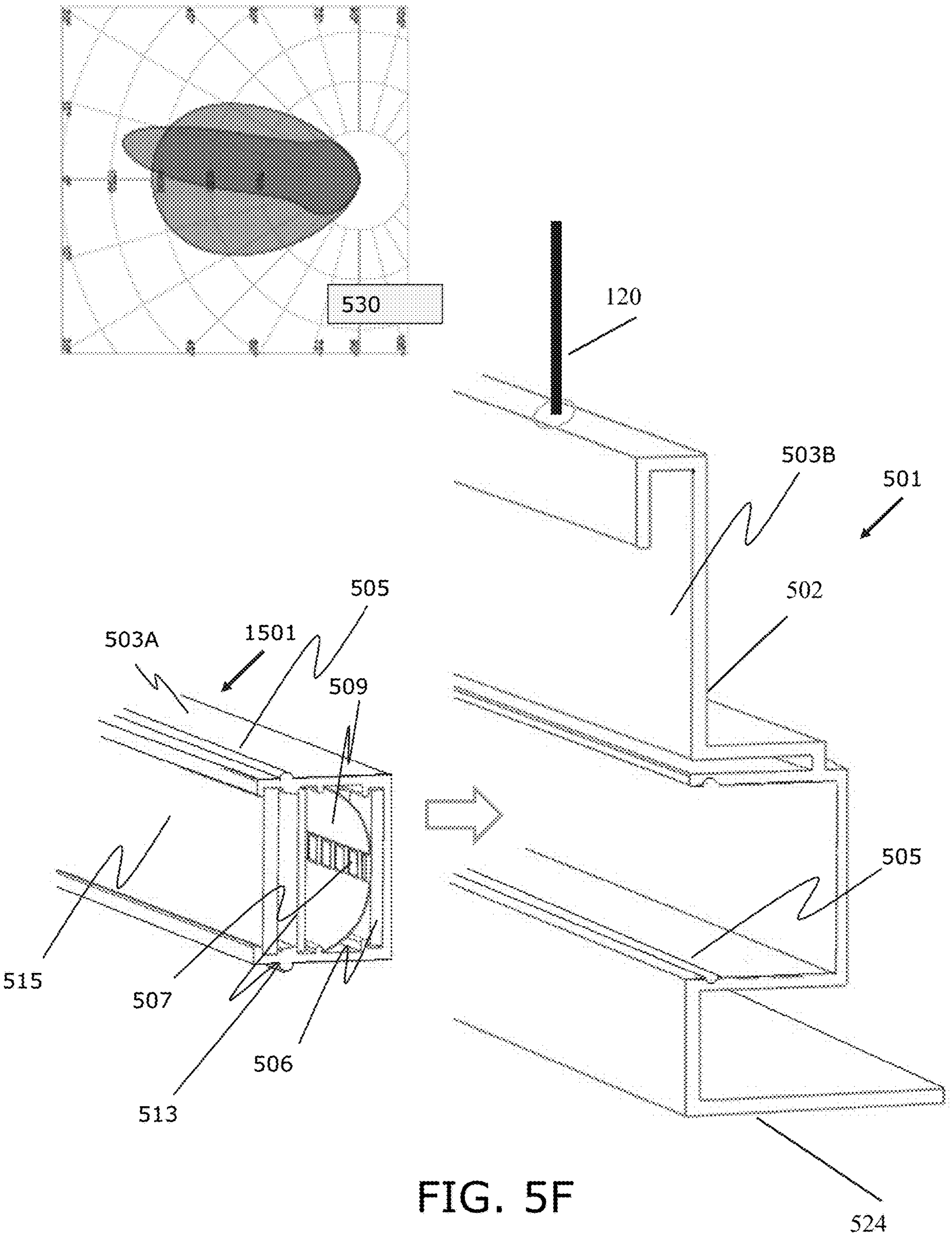
FIG. 5F is a cross section view of a linear lighting module with removable components.

The embodiment in FIG. 5F further illustrates how the linear lighting module 501 and linear support element 502 can be housed in two separate elongate housings. In this embodiment the linear lighting module is contained in elongate housing 503A and supported inside a second elongate housing 503B which is effectively the linear support element 502. In this embodiment the second elongate housing is used to retain the removable linear lighting module and connect or fix it to a T-Bar element. In these embodiment the linear support element 502 contain internal features 505 which can be used to help retain the linear lighting module once it is in place.

Figure 5G:
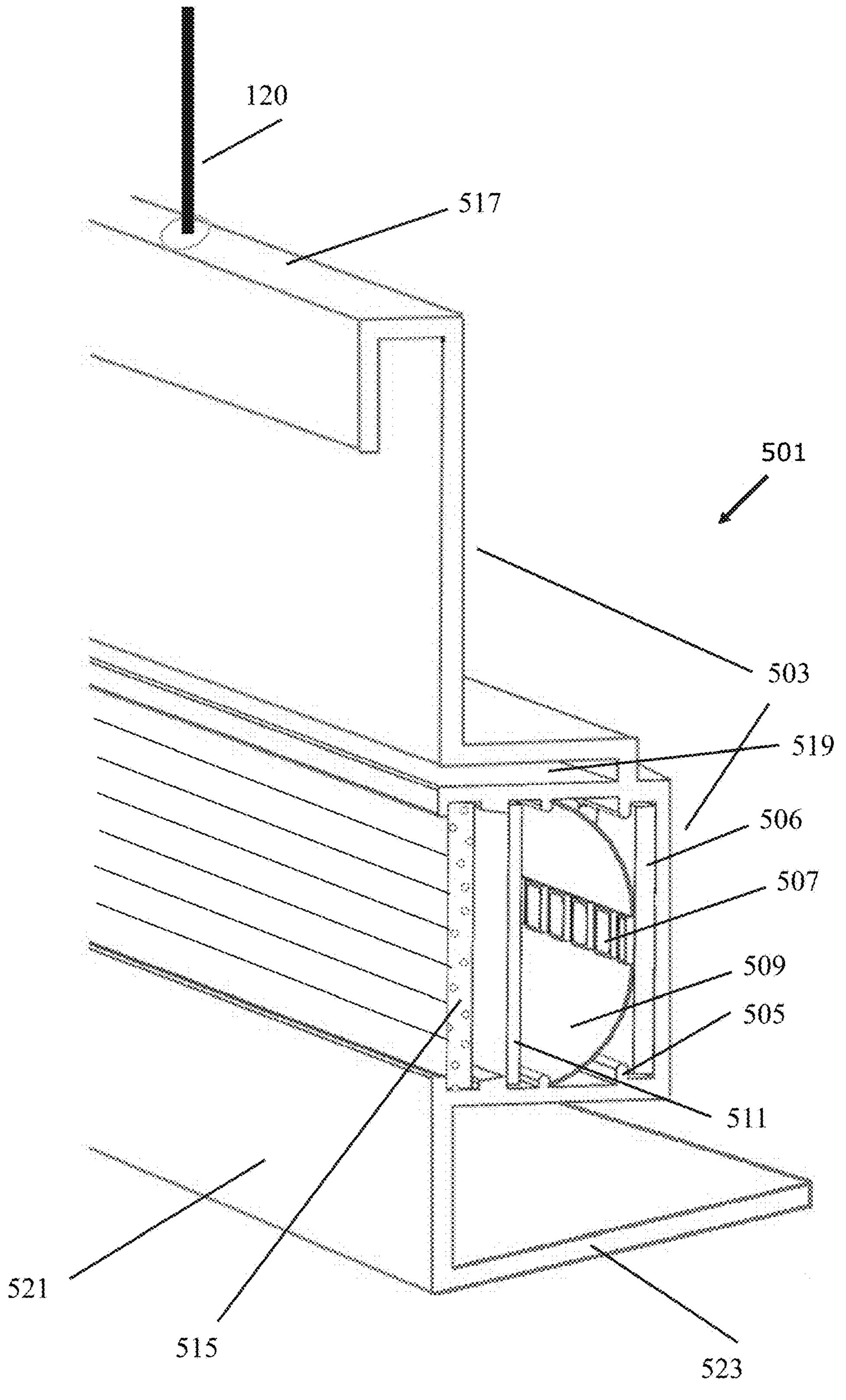
FIG. 5G is a cross section view of a linear lighting module with angled exterior support feature.

FIG. 5G is a perspective cross-section view of an embodiment of linear lighting module 501 comprising linear support element 502 with an integrated optical assembly. The linear support element 502 has an elongate body mounting portion 517 for mounting over the vertical portion of a T-Bar, a positioning slot 519 for mounting onto a horizontal portion of a T-Bar, and an angled support portion 523 for supporting an assembly ceiling panel 514 at an inclined angle. The elongate housing serves as both a structural member and also has positioning tabs for mounting optical components within the linear support element. These include a LED light source 507, a printed circuit board 506, a reflector 509, a first lens 511, and a second lens 515 with both linear microstructured features on its outer face and internal bulk diffusion properties which serves to further control the light distributions. The elongate housing also has an outer wall 521 which be configured to serve as a reflective surface or as a decorative surface. In this embodiment the lower panel support tab 518 is angled so as to support the ceiling panel at an angle that is tilted up from its edge and relative to the ceiling plane.

Figure 6A:
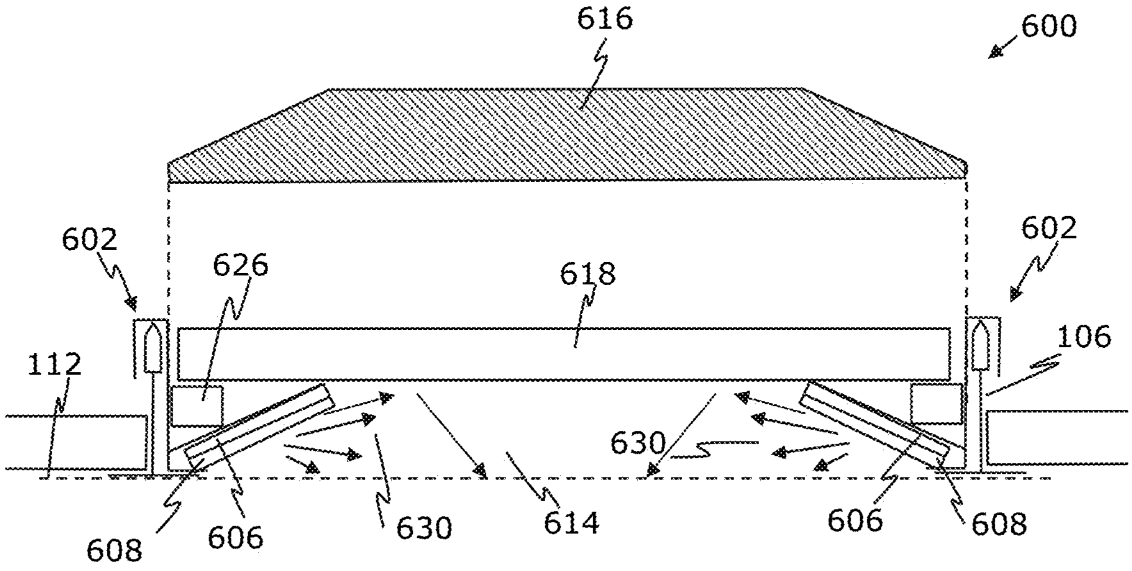
FIGS. 6A-6B are cross-section views of ceiling grid lighting assembly embodiment G incorporating an angled output face to the linear lighting module.
Figure 6B:
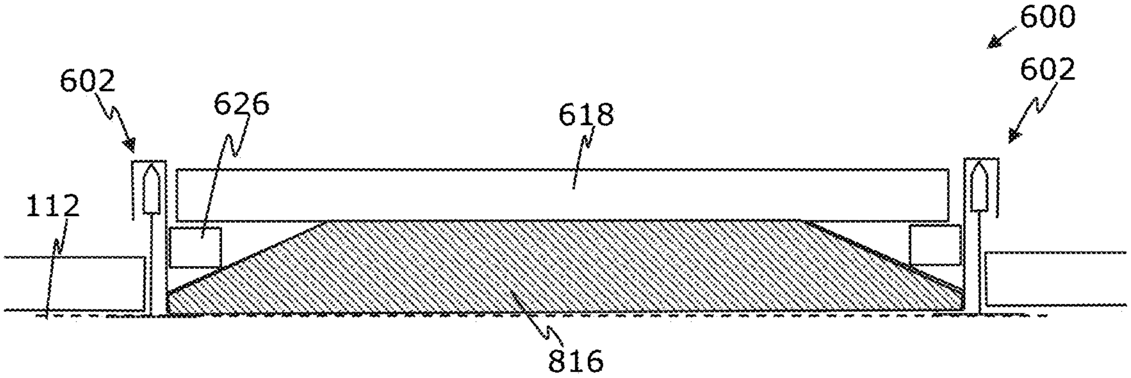

FIGS. 6A-6B are cross section views illustrating variations of ceiling grid lighting assembly embodiment 600 within a suspended ceiling grid system with and without covering element 616 in assembled position to provide an enclosing face of the optical cavity 614. In embodiment 600, the assembly ceiling panel 618 is supported horizontally above the elongate body of the linear support element. Furthermore, a printed circuit board 606 (with light source) and optical element 608 are oriented at an angle with respect to the ceiling grid plane 112. The inclined orientation tilts the optical element light distribution 630 and also provides a different aesthetic appearance. As illustrated, a portion of the light from the light source illuminates the underside of the assembly ceiling panel 618 and a portion is directed below the ceiling grid plane 112 into the room below. Some of the optical element light distribution 630 is circulated within the central optical cavity 614, for example, reflecting off of the assembly ceiling panel 618 and/or the covering element 616. Another portion of the optical element light distribution is projected directly from the optical assembly 601. A driver 626 is positioned and obscured from view by the linear support element 602 as well as the light source and optical element.

Figure 6C:
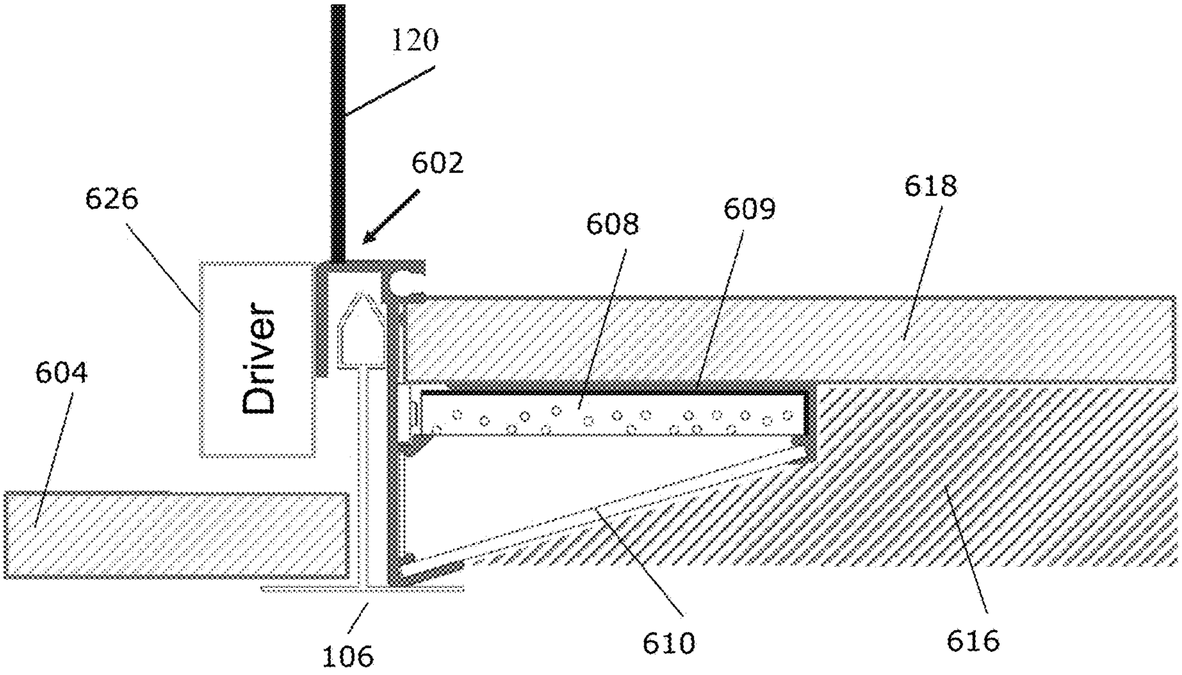
FIG. 6C is a cross section view of a linear lighting module with angled output face.

FIG. 6C provides specific details of an embodiment linear lighting module and its integral linear support element. A printed circuit board 606 (with light source) inputs light into the edge of an edge-lit diffuser 608 and light is subsequently propagated through a second lens 615 which is positioned at an inclined angle with respect to the ceiling grid plane 112 and the edge lit diffuser 608 which are approximately parallel to each other. The edge-lit diffuser of FIG. 6C is a rectangular shape but an alternate embodiment is a wedge shape. A reflector 609 is positioned behind the edgelit diffuser to help improve efficiency and uniformity of the light output. Additionally, a portion of the reflector further wraps around a corner of the edge-lit diffuser to provide a reflective surface on the edge-lit diffuser face that opposes the input face. In this embodiment an LED driver 626 is further supported by the linear support element on the opposing side of the T-bar. The linear support element is further attached the structural ceiling by a suspension cable 120.

Figure 7A:
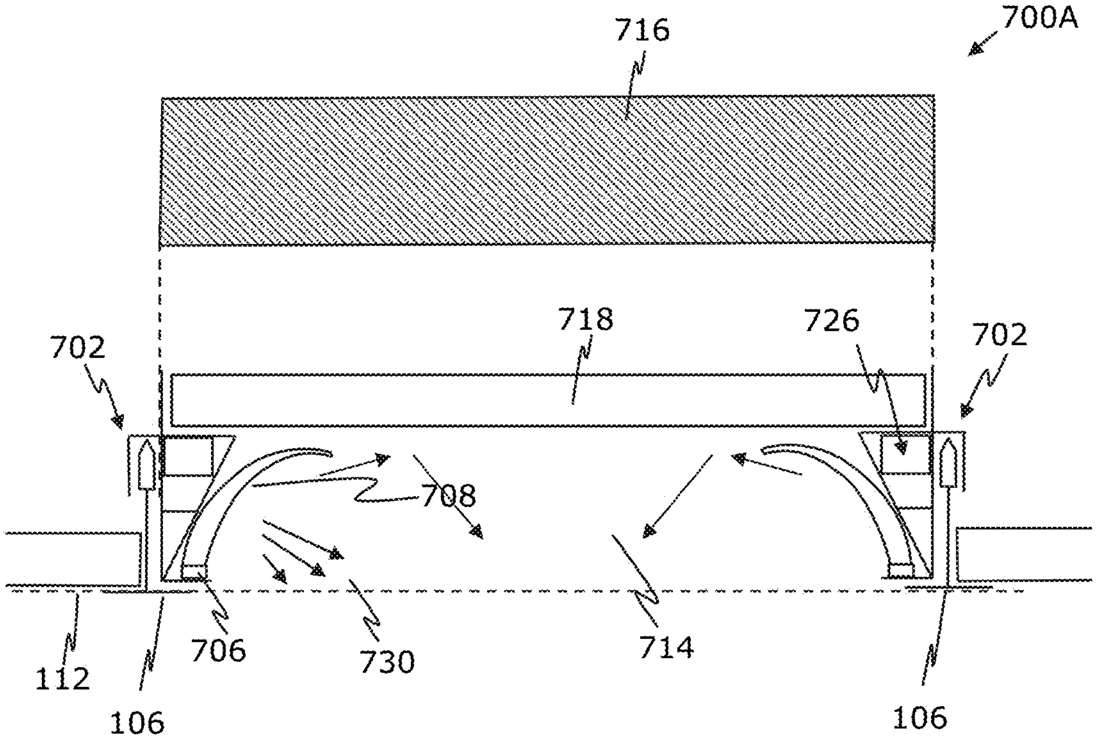
FIGS. 7A-7B are cross section views illustrating variations of ceiling grid lighting assembly embodiment type H incorporating an arcuate shaped output face.
Figure 7B:
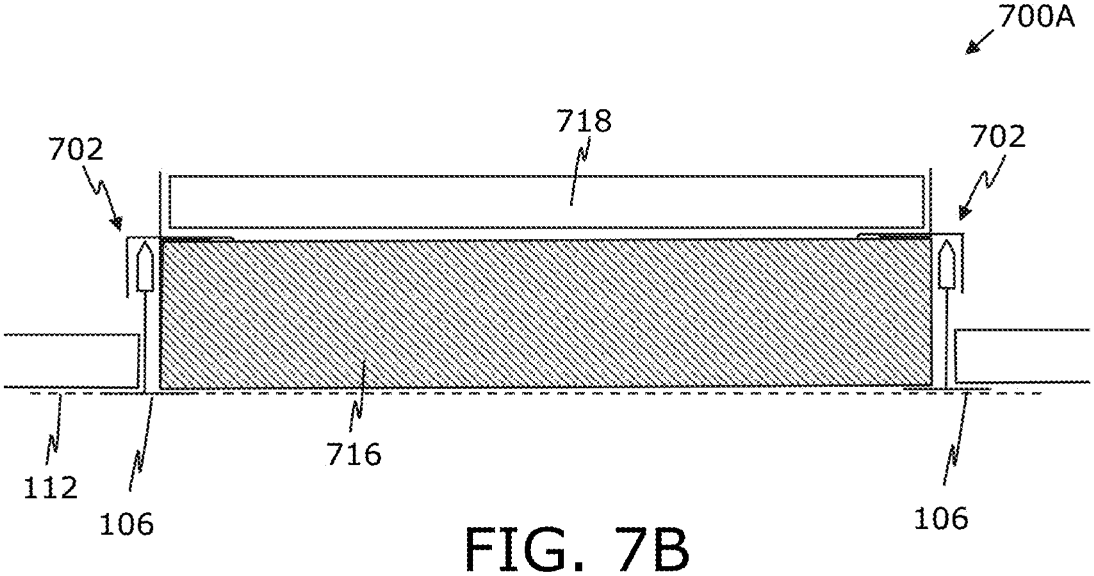

FIG. 7A-7B are cross-section views of ceiling grid lighting assembly embodiment 700A with and without covering element 716 in assembled position to provide an enclosing face of the optical cavity 714 that is additionally bounded by the assembly ceiling panel 718 that is supported by the linear support element 702 at a height above the height of the T-Bar 106. As illustrated, a portion of the light from the light source illuminates the underside of the assembly ceiling panel 718 and a portion is directed below the ceiling grid plane 112 into the room below. The edgelit optical element of FIG. 7A is an extruded arcuate shaped edgelit light guide 708 that is positioned proximate to a printed circuit board 706 (with light source). The light guide is essentially a curved wedge shape version of light guides used in other embodiments. This optical element can also be configured to provide light distribution control, brightness uniformity, and aesthetic interest benefits and typically has a reflector positioned proximate to its internal face and a secondary optical element can also be used such as a diffuser or light shaping lens to help further improved uniformity of light and its distribution.

Figure 7C:
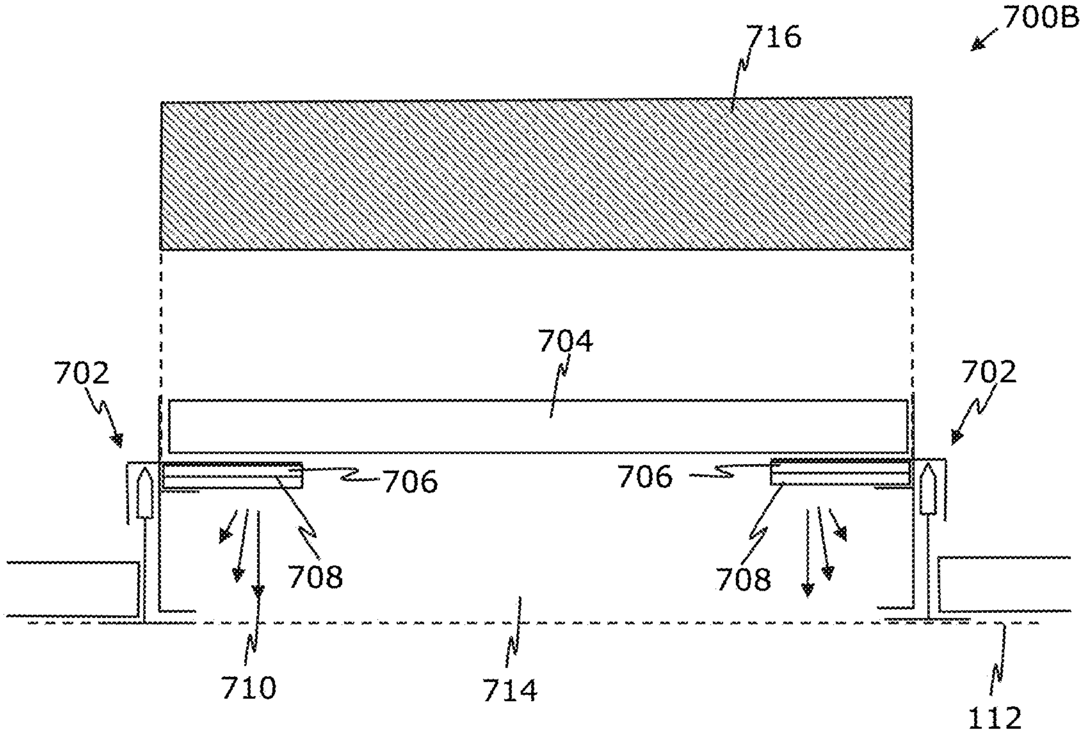
FIGS. 7C-7D are views illustrating variations of ceiling grid lighting assembly embodiment I with elevated horizontal output face.
Figure 7D:
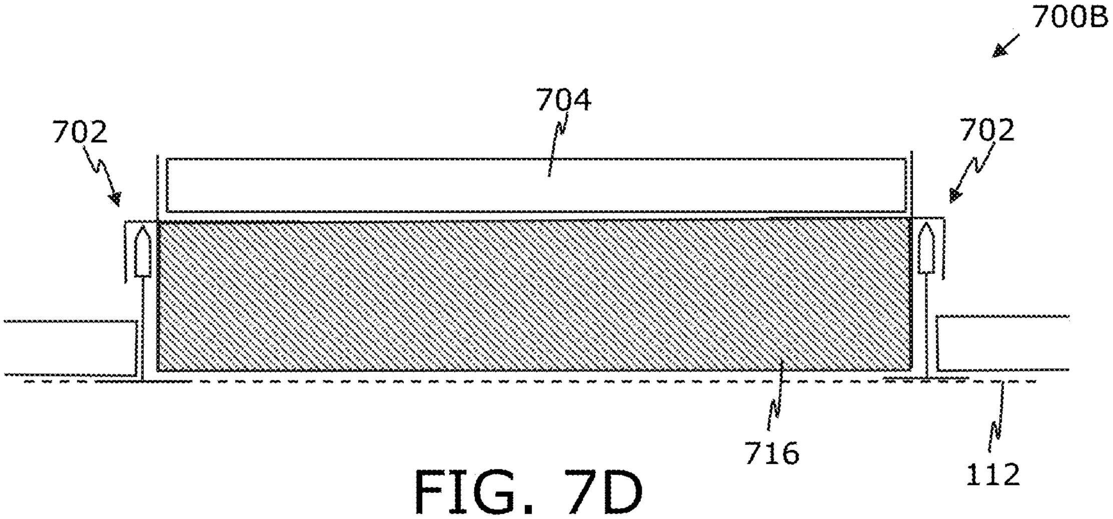

FIG. 7C and FIG. 7D are cross section views of ceiling grid lighting assembly embodiment 700B with and without the covering element 716 in assembled position to enclose the central optical cavity 714. FIG. 7C illustrates details of variations in embodiment linear support element wherein light from a horizontally mounted edgelit low clarity diffuser 708 propagates through a second lens 715 and into the optical cavity 714. In FIG. 7C the edgelit diffuser 708 is positioned below the assembly ceiling panel 718.

Figure 8A:
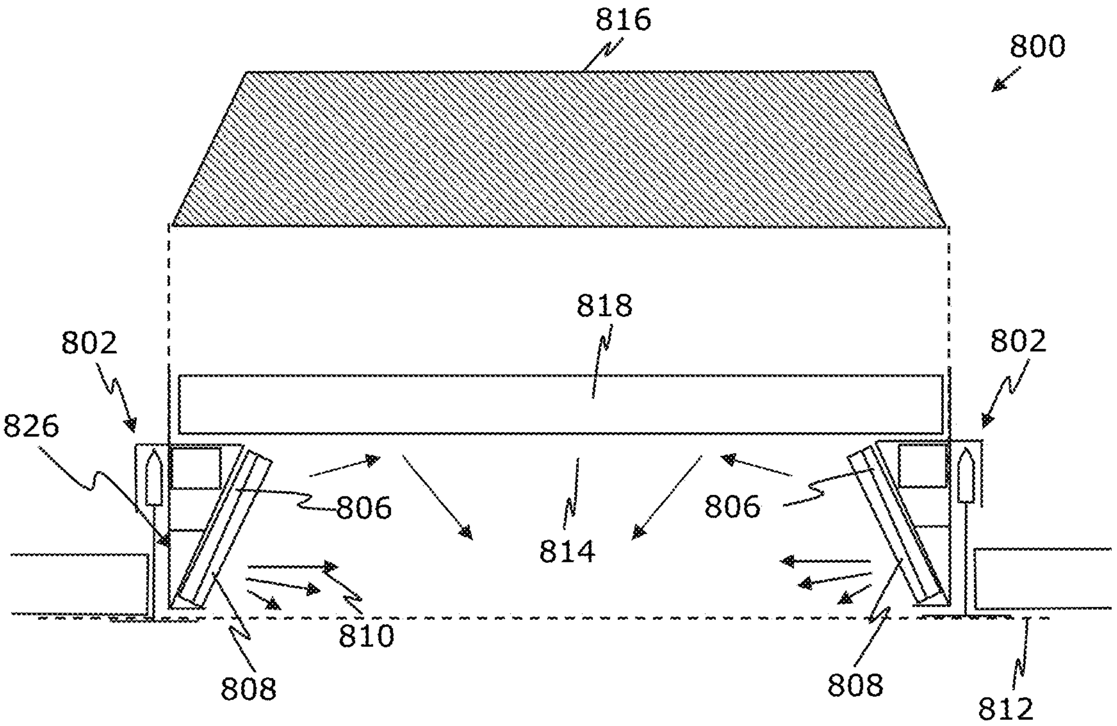
FIGS. 8A-8B are views illustrating variations of ceiling grid lighting assembly embodiment J with angled output face.
Figure 8B:
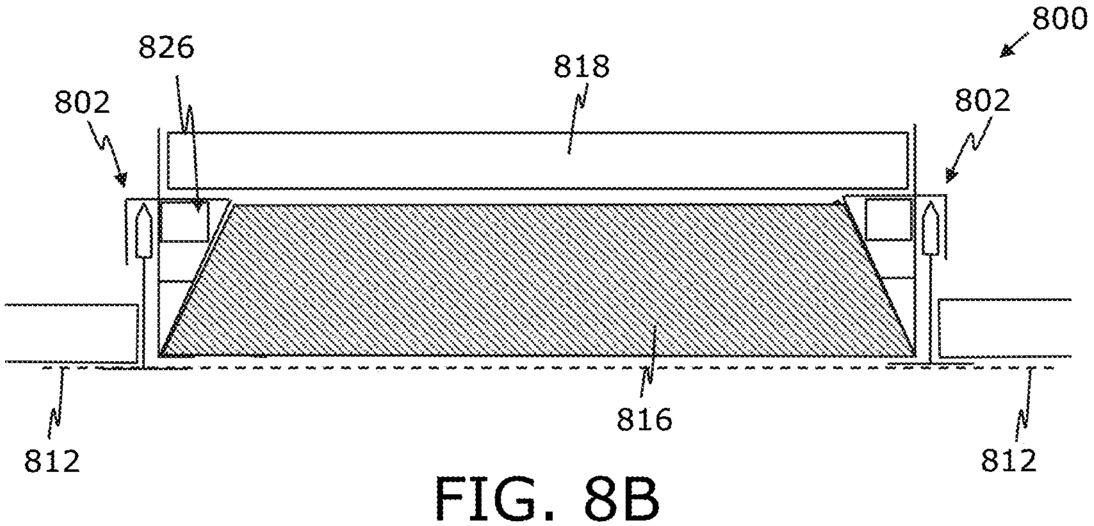

FIGS. 8A-8E are views illustrating variations of ceiling grid lighting assembly embodiment type 800 within a suspended ceiling grid system which contains linear support element 802 supports the ceiling panel horizontally 816 at an elevated height relative to the ceiling grid plane 812 and is further comprising an optical element 808 which is angled or tilted with respect to the ceiling grid plane 812. FIG. 8A and FIG. 8B are cross section views with and without the covering element 816 in assembled position to enclose the central optical cavity 814. As illustrated, a portion of the light from the light source illuminates the underside of the assembly ceiling panel 818 and a portion is directed below the ceiling grid plane 112 into the room below.

Figure 8C:
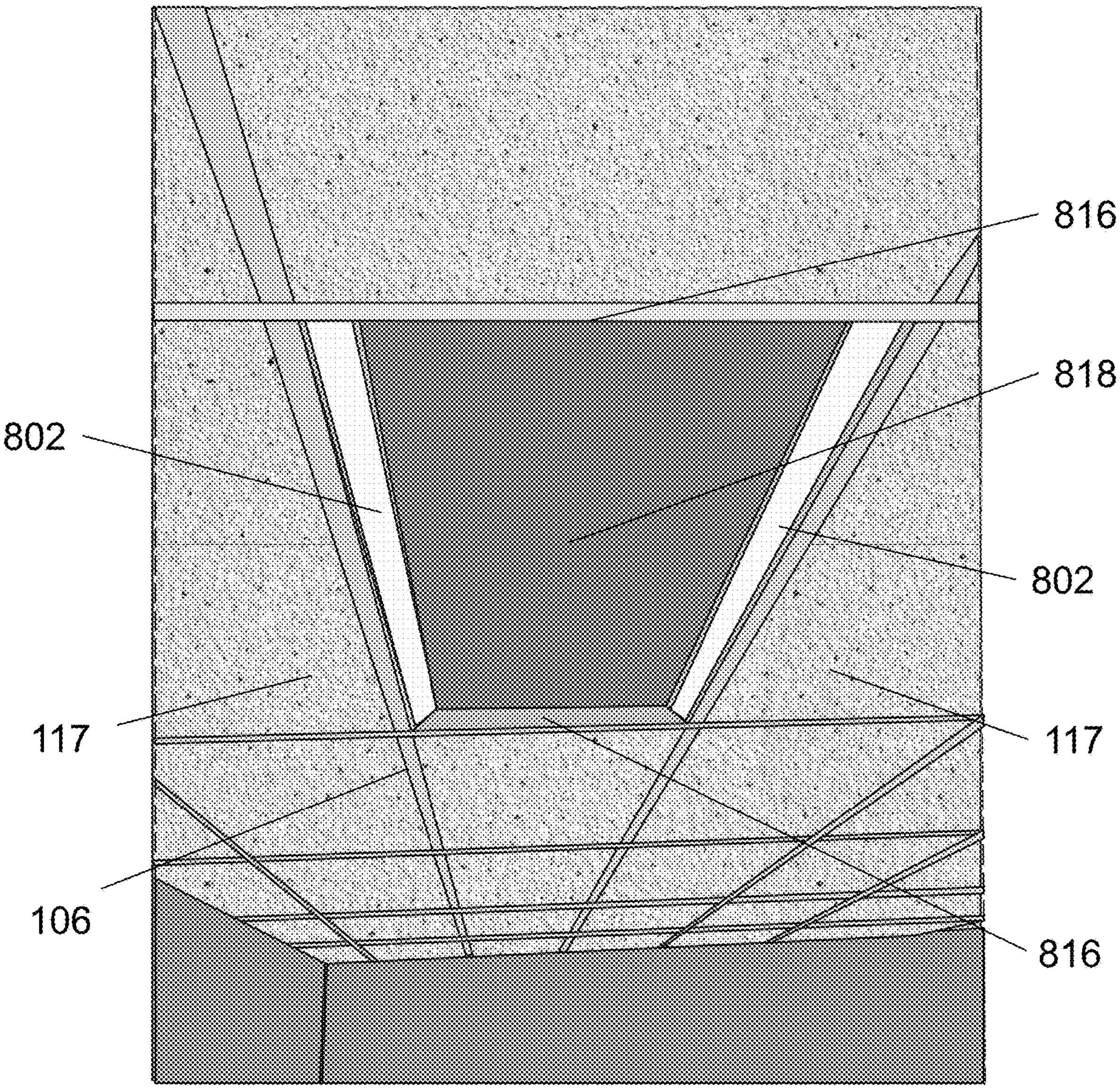
FIG. 8C is isometric diagram illustrating the embodiment J in a ceiling grid assembly.
Figure 9A:
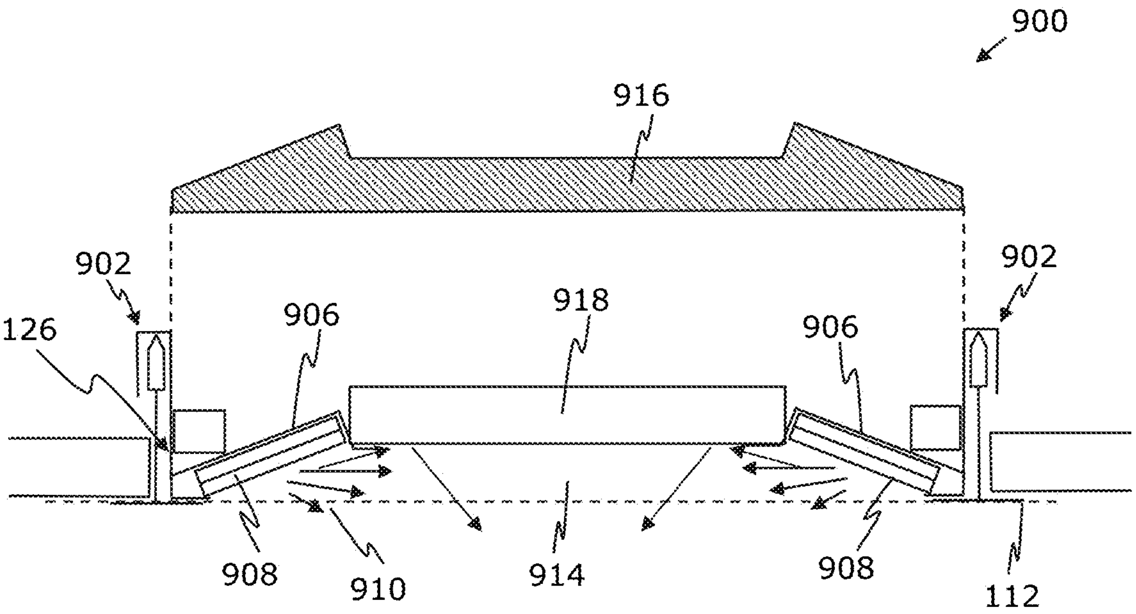
FIGS. 9A-9B are views illustrating variations of ceiling grid lighting assembly embodiment K with angled output face.
Figure 9B:
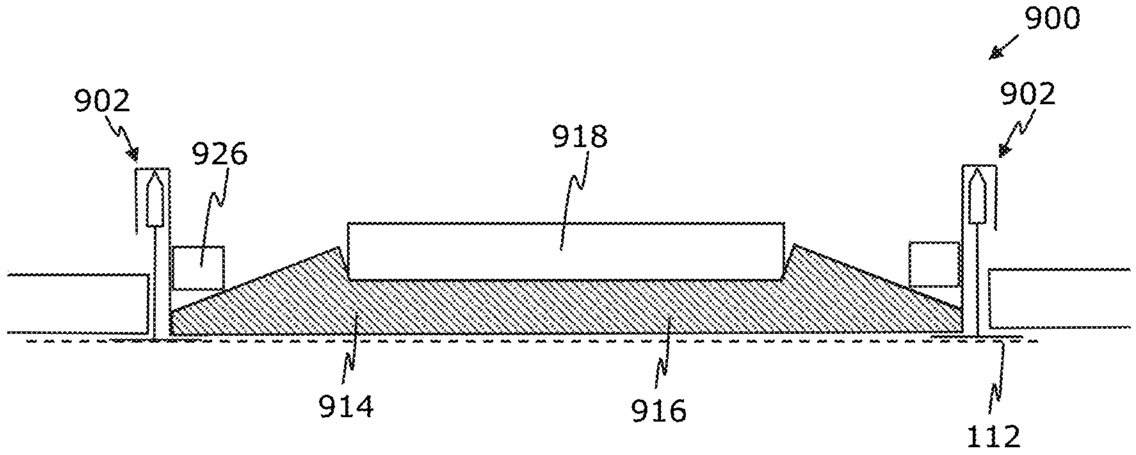

FIG. 8C shows a below ceiling grid perspective view of the embodiment 800 when applied to a 2 ft×4 ft ceiling grid cell. In the embodiment the assembly ceiling panel is comprised of colored acoustic felt FIGS. 9A-9B are views illustrating variations of ceiling grid lighting assembly embodiment type 900 within a suspended ceiling grid system wherein an assembly ceiling panel 918 is smaller in width than the T-Bar grid spacing and supported by two opposing linear support elements 902 which each also hold in inclined position printed circuit board 906 (with light source) and optical element 908. As illustrated, a portion of the light from the light source illuminates the underside of the assembly ceiling panel 918 and a portion is directed below the ceiling grid plane 112 into the room below. FIG. 9A and FIG. 9B show respectively views with and without the covering element 916 in assembled position as an enclosing face of the central optical cavity 914.

Figure 9C:
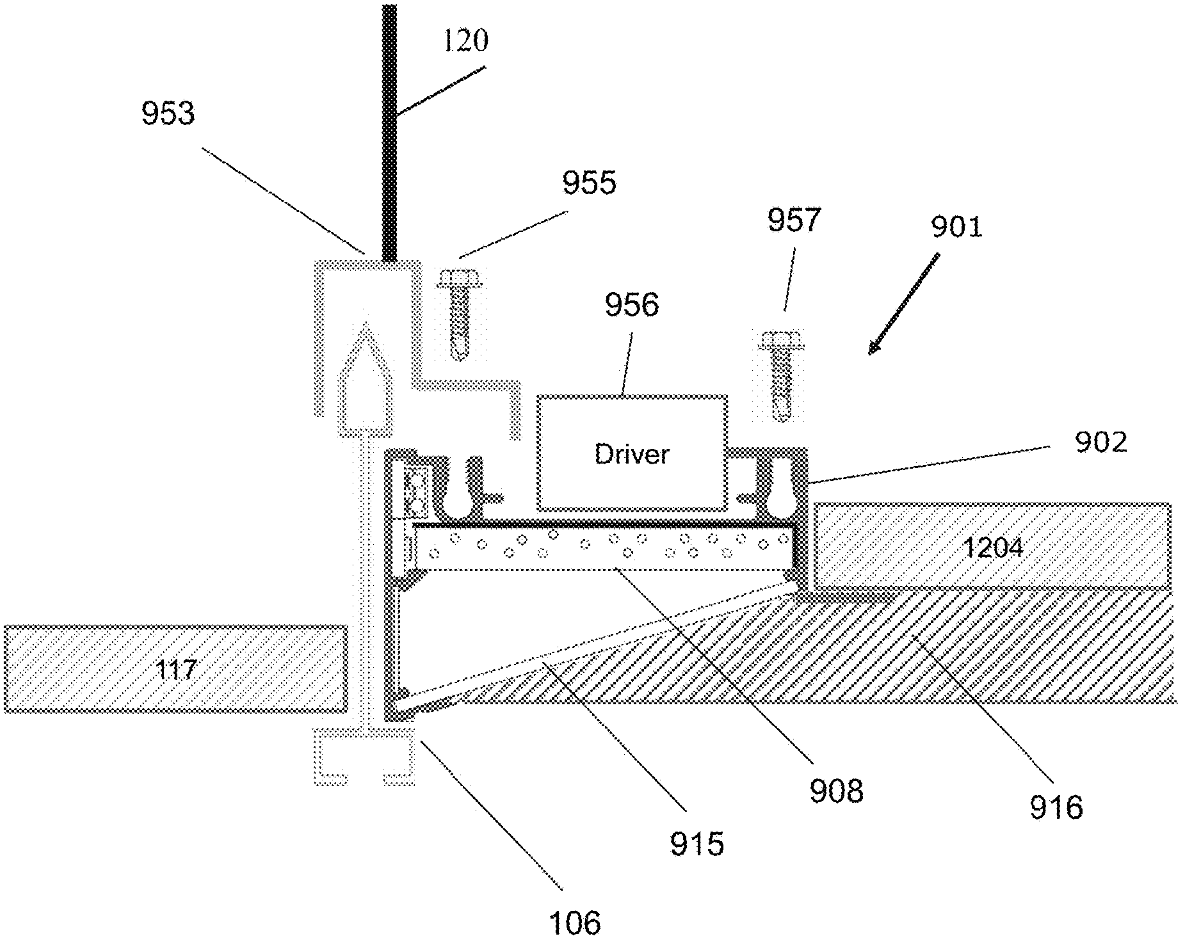
FIG. 9C is isometric diagram illustrating the embodiment K in a ceiling grid assembly.

FIG. 9C illustrates detail of embodiment linear lighting module 901 comprising support element 902 configured to mount onto a T-Bar wherein the light source comprises an LED board with linear array of LEDs and the optical element 908 is an edgelit diffuser mounted in a horizontal position. Furthermore, a second lens acting as the output surface of the module 915, is positioned at an inclined angle in order to adjust the light distribution output and/or increase brightness uniformity. FIG. 9C also illustrates an embodiment configured to mount on a T-Bar with the covering element 916 and linear support element 902C further comprising a mounting bracket 953 which is fastened in position with screws 955 to mount onto the T-Bar 106. Furthermore, the driver 926 can also be mounted to the linear support element by a bracket and screw 957.

Figure 10:
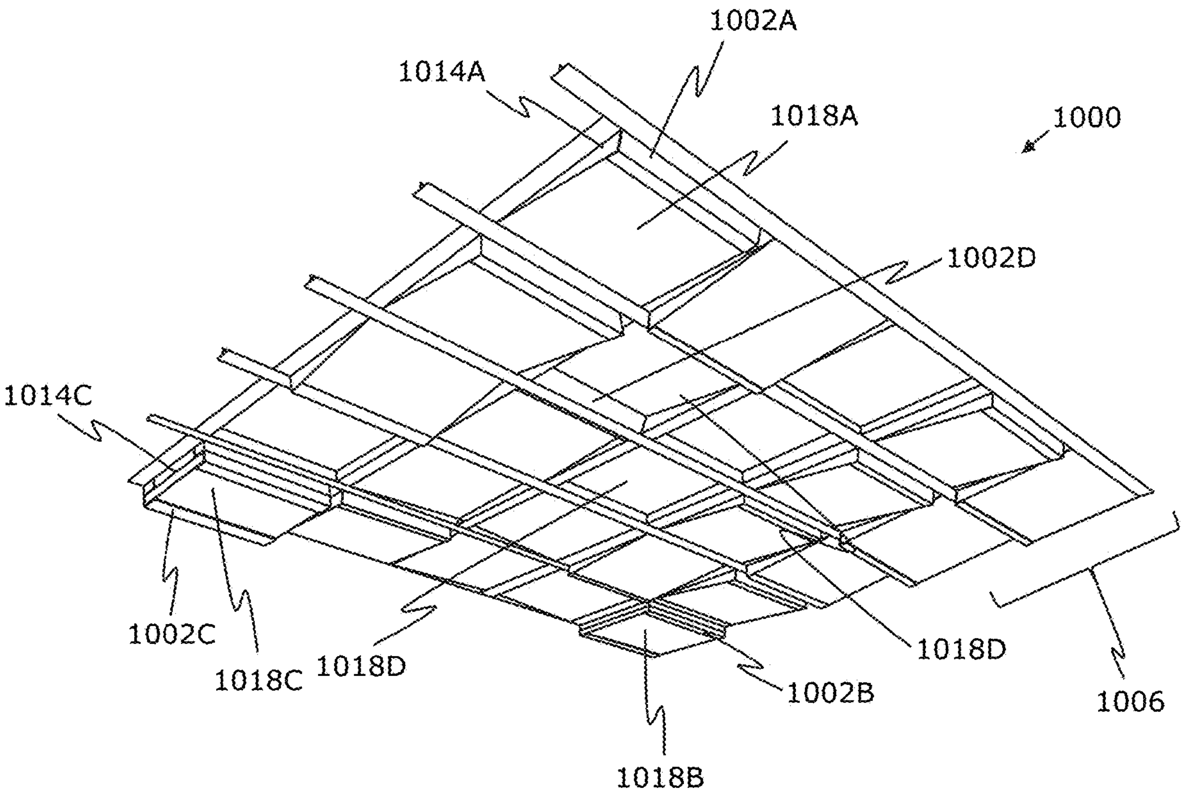
FIG. 10 is an illustration of a perspective below ceiling view of an exemplary ceiling grid system with multiple embodiments of ceiling grid lighting arrays.

FIG. 10 is an illustration of a ceiling grid system 1000, utilizing several examples of ceiling grid lighting assembly embodiments in accordance with the present disclosure. As shown, the ceiling grid system 1000 comprises at least one ceiling panel 1018A-D supported by at least one linear support elements 1002A-D As shown, the at least one ceiling panel 1018A-D are supported in a tilted (or higher or lower) manner relative to a ceiling grid plane 1006 of the ceiling grid system 1000. Such supporting of the at least one ceiling panel 1018A-D by the at least one linear support elements 1002A-D provides a three-dimensional appearance to the ceiling grid system 1000. The ceiling system 1000 also depicts covering elements, such as covering elements 1014A-B1.

Figure 11A:
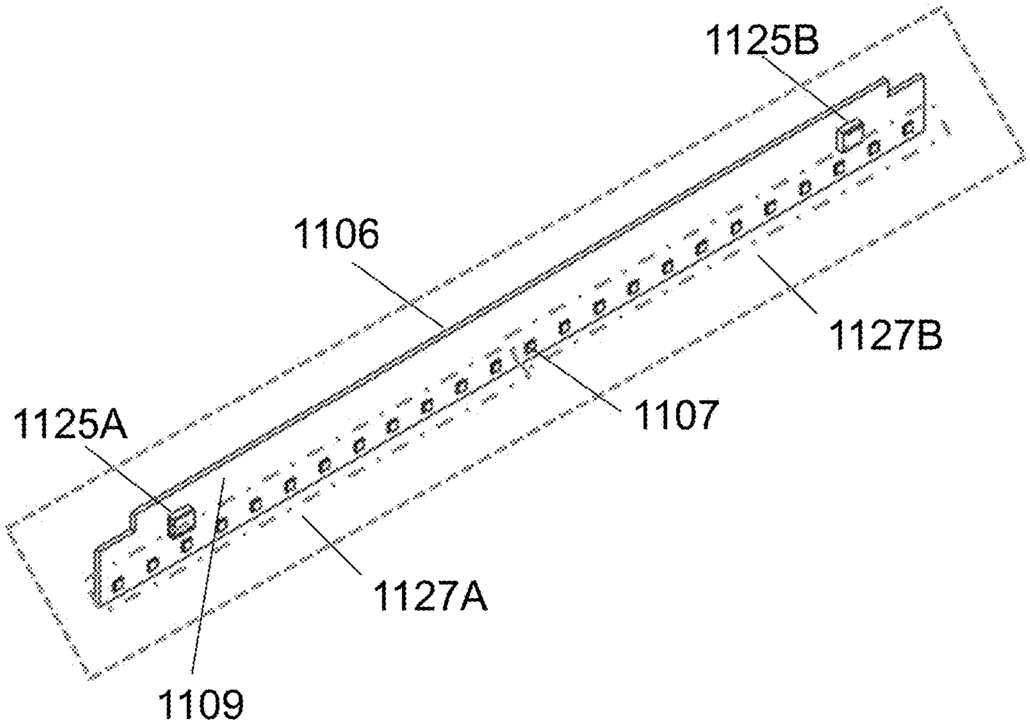
FIG. 11A and FIG. 11B are embodiment LED light sources.
Figure 11B:
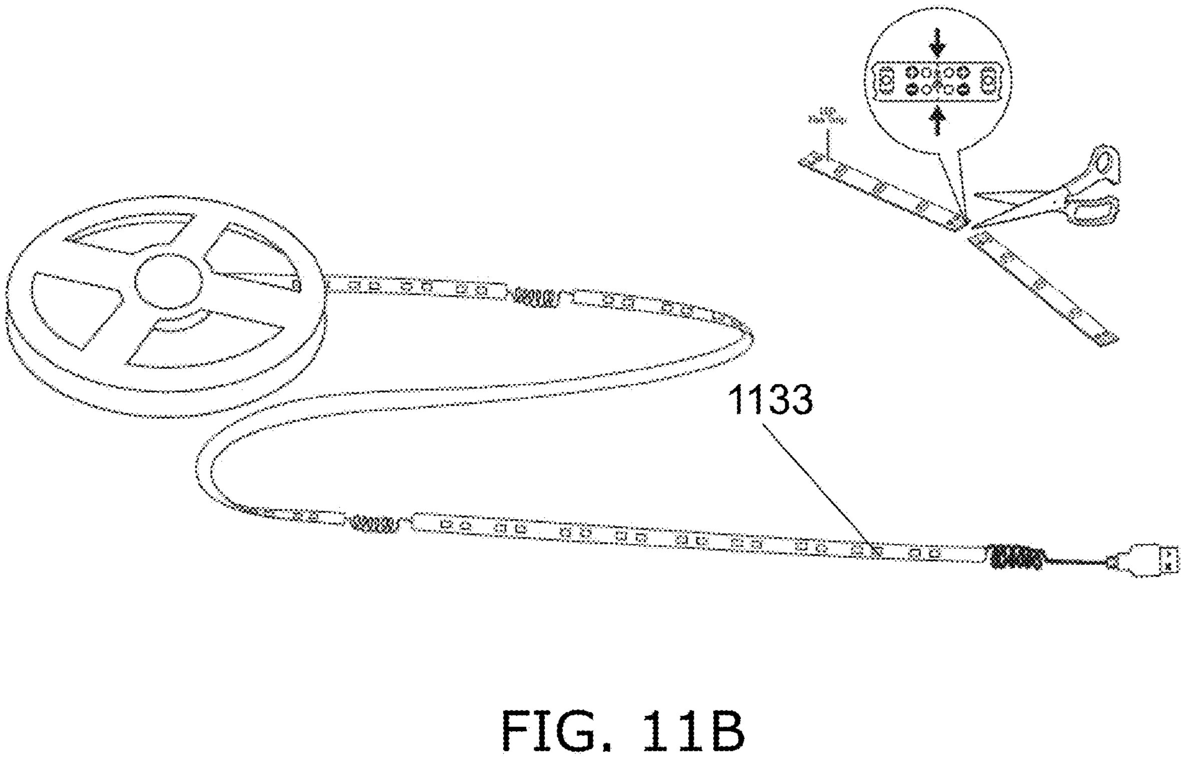

FIG. 11A and FIG. 11B are embodiment configurable linear LED boards; FIG. 11A showing an embodiment with rigid linear printed circuit board (PCB) 1106 with packaged LED light sources 1107 mounted on the PCB and connected via its electrical circuit. The configurable linear LED light source 1133 of FIG. 11A shows a version with two individual electrical channels 1127A and 1127B each one having a separate electrical connector 1125A and 1125B which allow the string of 12 LEDs connected in series 1109 in each electrical channel to be electrically addressed and controlled. In the embodiment shown the LEDs 1107 are arranged into two parallel connected circuits of 12 LEDs in series. The forward voltage is approximately 33V although this is typically modified to match the requirements of the driver or controller being used. The rigid PCB board 1106 can also be cut to length at increments between each electrical channel. FIG. 11B illustrates a flexible strip which can be cut to length off of a reel. As shown in FIG. 11B, configurable linear LED light sources 1133 can also be manufactured on a flexible circuit material and supplied in a "tape-like" format on a reel with multiple segments corresponding to a maximum required length and then cut to length as needed for various versions of linear support elements.

Figure 11C:
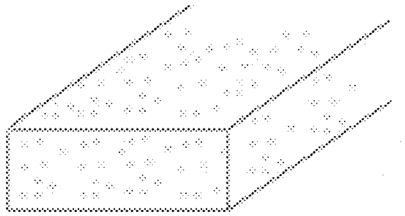
FIG. 11C isometric illustrations of various embodiments of edglit optical elements used in ceiling grid lighting assemblies.
Figure 11C:
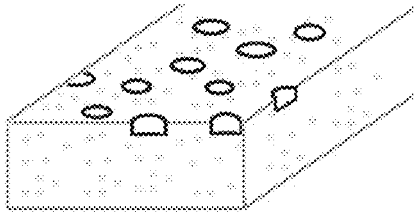
Figure 11C:
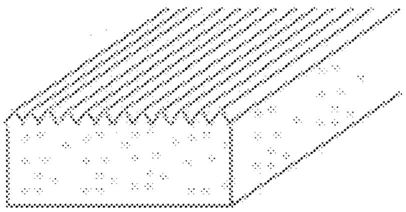
Figure 11C:
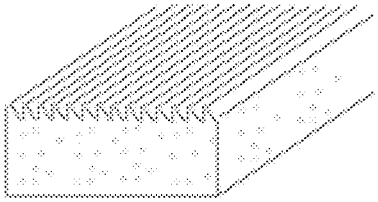
Figure 11C:
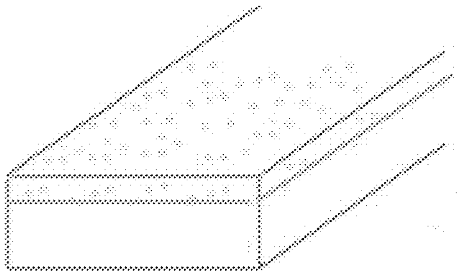
Figure 11C:
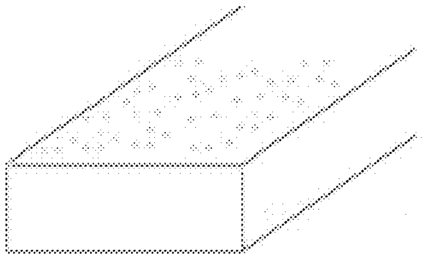
Figure 11C:
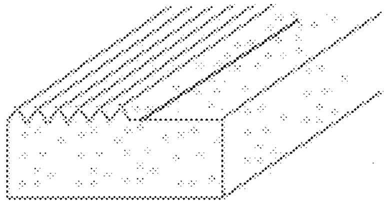

FIG. 11C isometric illustrations of various embodiments of edglit optical elements used in ceiling grid lighting assemblies illustrating key elements. Important to various embodiments are dimensions of width and height. Volumetric light diffusion is produced by dispersed regions within the light guide having refractive index different than the bulk matrix material. Concentration of diffusing blend is an important variable in effecting light scattering properties that influence angular light distribution and uniformity of beam pattern. Embodiments described include in the light guide formulation a specific commercially available diffusion resin, Plexiglas® Diffuse V045 blended into clear PMMA resin at the indicated weight percent within a range from zero to 20%. Alternative means in creating dispersed regions of differing refractive index from the light guide matrix material include dosing microbeads into the light guide resin formulation as well as forming second phase regions in situ during by fluid phase mixing of immiscible blends of polymers. In addition to refractive index, the quantity per volume, size, and shape of dispersed regions effect light scattering properties. In the case of immiscible blends formed by fluid phase mixing, the shape of second phase regions may be other that spherical, for example oblate paraboloid, thereby generating non-symmetric light scattering. Processes for fabricating light guides include extrusion and injection molding. Surface features and their pattern of arrangement on a face of the light guide are of importance in converting internal reflection within the light guide to output from the module at desired angular light distribution.

FIG. 11D is table containing optical properties of various embodiments of edgelit optical elements. Ceiling grid lighting assemblies were configured using both high clarity light guides and low clarity edgelit diffusers.

Figure 11E:
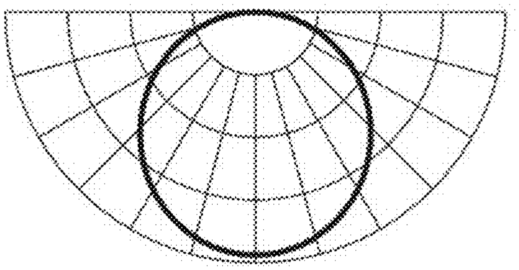
FIG. 11E represents in polar plot form a sampling of light distribution types achievable with variously configured ceiling grid assembly embodiments.
Figure 11E:
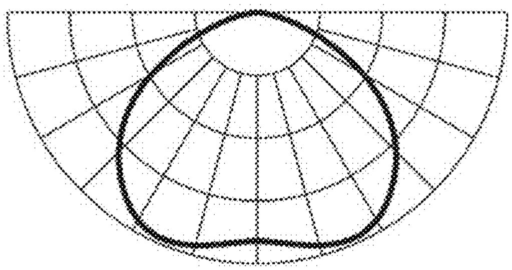
Figure 11E:
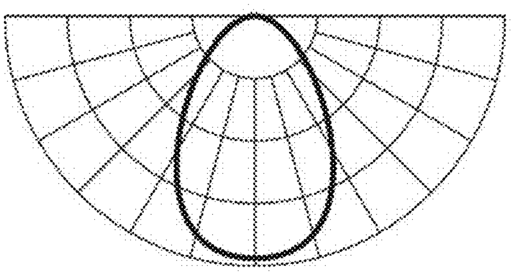
Figure 11E:
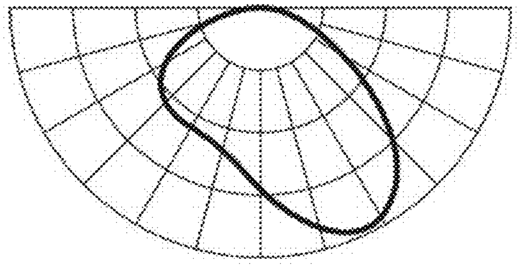
Figure 11E:
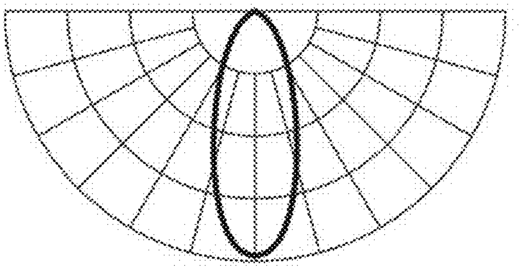
Figure 11E:
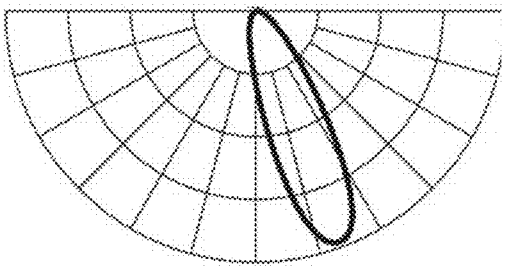

FIG. 11E illustrates the range of lighting distributions that can be achieved by configuring the linear lighting module. A wide range of non-lambertian, anisotropic lighting distributions are provided based upon various direct lit and edgelit optical elements and a secondary outer lens with varying degrees of volumetric light scattering and surface microstructures such as prisms, microlens and sawtooth lenticular features. Lighting distributions are possible that are anisotropic or non-lambertian and lighting distributions can also be tilted or asymmetric which is particularly important for wall washing, task lighting or cove lighting. In general, overall light distribution of a ceiling grid lighting assembly correlates with the light distribution of individual light sources, optical elements, and ceiling panels within the ceiling grid lighting assembly and particular components and their arrangement can be selected to create specific desired light distributions. Additional lighting distributions can also be achieved by changing the configuration of the edgelit optical element, e.g. light guide or edgelit diffuser.

Figure 12A:
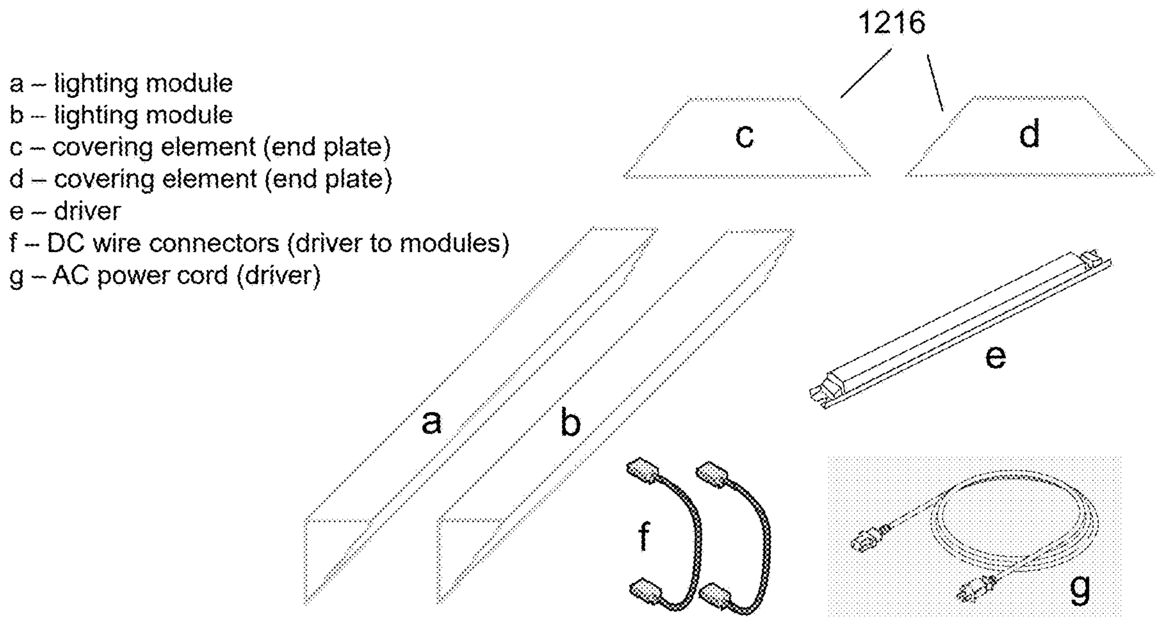
FIG. 12A is an illustration of individual components for use in configuring and installing embodiment ceiling grid lighting assemblies in combination with an existing ceiling grid system.

FIG. 12A is an illustration of individual components for use in configuring and installing embodiment modular ceiling grid lighting assemblies in combination with a ceiling grid system. A benefit of the ceiling grid lighting assembly as detailed in the embodiments is that it can be shipped as a kit of parts and "flat packed" which can significantly save on volume and weight. This in turn can reduce carbon footprint. The parts can also be designed to easily connect together at the job site prior to install. Linear support elements can be preassembled with integrated optical assemblies prior to shipment, and other components including the covering elements 1216 can be selected for retrofit into an existing ceiling grid system or for concurrent assembly into a new installation.

Figure 12B:
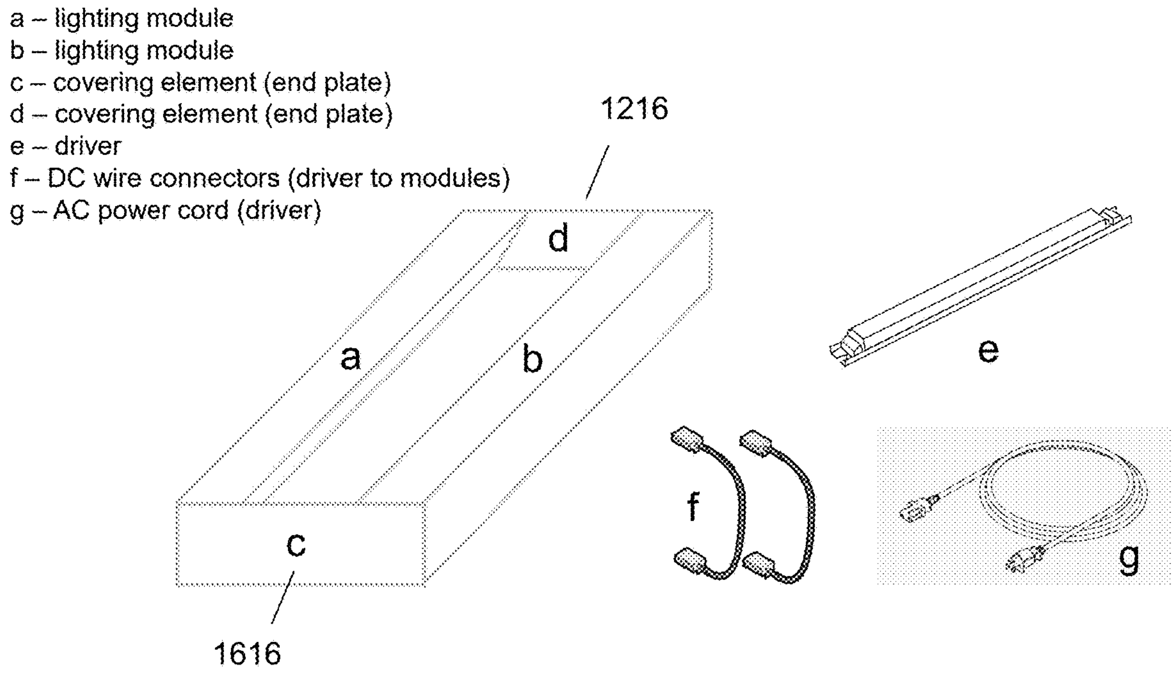
FIG. 12B is and illustration of partially pre-assembled components for use in configuring and installing embodiment ceiling grid lighting assemblies in combination with an existing ceiling grid system.

FIG. 12B is an illustration of partially pre-assembled components for use in configuring and installing embodiment ceiling grid lighting assemblies in combination with an existing ceiling grid system or in the case of a new installation, suspended ceiling grid components. In this illustration the ceiling grid lighting assembly can be shipped as a partial assembly of the linear support element (a & b) and covering elements (c & d) 1216 securely connected to each other assembled. The remaining driver 1226, wire connectors and power cord are packed and shipped individually.

Embodiment lighting modules and lighting assemblies provide advantages in configuring lighting fixtures within ceiling grid arrangements to meet seismic design considerations; for example as defined by the International Building Code Seismic Design Categories D, E & F. In particular embodiments of modular ceiling grid lighting assemblies may be configured for advantage in seismic design compliance by reducing light fixture weight, providing alternative grid attachment, and allowing improved plenum accessibility thereby specifically 1) providing means of positive attachment to the ceiling grid, 2) eliminating the need for supplemental hanging wire since an integrated linear support element could replace a cross runner and support at least 10 lbs, 3) allowing for easier, quicker and cheaper slack wire attachment for lighter weight categories, 4) avoiding the need of "approved hangers" for fixtures weighing over 56 lbs, and 5) providing a safe and flexible electrical "conduit" system within the overall ceiling grid assembly.

Embodiments of the present disclosure provide a lighting assembly within a ceiling grid system. In another aspect, the present disclosure also provides a ceiling grid system comprising T-Bar cells defined by the vertical and horizontal portions of the T-Bars. The ceiling grid system comprises at least one supporting element, wherein the ceiling grid system may be formed by supporting a plurality of ceiling panels thereon the at least one supporting element. Such supporting of the plurality of ceiling panels on the at least one supporting element enables convenient installation and replacement of the ceiling grid system, such as, by arranging the at least one supporting element on the T-Bars and arranging the plurality of ceiling panels on the at least one supporting element. Furthermore, when one or more of the at least one supporting element are determined to have a defect therein, the defective supporting element can be easily replaced without having to replace an entirety of the ceiling grid system. Furthermore, the at least one supporting element may be easily fabricated in a cost-effective manner to have different properties (such as, orientations of linear and/or ceiling panel supporting portions) relative to each other, thereby, enabling to provide different appearances and easy customizability to the ceiling grid system. The supporting elements can be used to support the plurality of ceiling panels, as well as other components, such as utility components including electrically and/or electronically operated devices such as sensors, at least one optical element such as light guides and so forth. Such utility components and the at least one optical element can be used to provide additional functionality to the ceiling grid system (such as, using a plurality of sensors, smoke detectors and so forth for increasing a safety in an enclosure wherein the ceiling grid system is installed), and/or for improving an aesthetic appearance associated with the ceiling grid system (such as, by using at least one light source, multichromatic light sources and so forth), respectively. Furthermore, the ceiling grid system includes the at least one supporting element mounted on T-Bars to support the plurality of ceiling panels. Such supporting elements can be mounted on existing T-Bars associated with conventional ceiling grid systems, thereby, enabling easy, time-efficient, and cost-efficient replacement of a conventional ceiling grid system with a ceiling grid system of the present disclosure. For example, when the conventional ceiling grid system comprises troffer fixtures therein, the at least one supporting element can be installed on the conventional ceiling grid system, such as in a 2×4, 2×2 or 1×4 configuration. For example, two supporting elements with an integrated optical assembly can be installed on either side of the troffer fixture and two supporting elements can be installed on either end of the troffer fixture, with a ceiling panel arranged on one or more of the at least one supporting element. Alternatively, a covering element can be arranged on the at least one supporting element instead of the at least one ceiling panel without limiting the scope of the disclosure. Beneficially, the present disclosure provides a ceiling grid system to improvise maintenance of the appearance of ceiling panels. Specifically, the at least one supporting element is mounted on the T-Bars of the ceiling grid arrangements to support the plurality of ceiling panels at different orientations such as in a plane parallel, above, below, and at a tilted angle to the horizontal portions of the T-Bars defining the ceiling grid plane. Additionally, the plurality of ceiling panels are arranged at different orientations to provide a three-dimensional appearance to the ceiling grid system. It will be appreciated that such a ceiling grid system having the three-dimensional appearance corresponds to an appealing appearance thereof. Furthermore, orientations of the at least one supporting element and/or ceiling panel can be easily changed, thereby, enabling convenient customization of the ceiling grid system.

Additionally, as shown in FIGS. 3-14, according to an embodiment, in the ceiling grid lighting assembly 301, 401, 501, 601, 701, 801, 901, 1001, 1101, 1201, 1301, 1401 the at least one linear support element 302, 402, 502, 602, 702, 802, 902, 1002, 1102, 1202, 1302, 1402 comprises a mounting portion that mounts over the vertical portion 108 (shown in FIG. 10) of a ceiling grid T-Bar 106. In the aforementioned embodiments the linear support element comprises the mounting portion that is mounted over the vertical portion 108 of the T-Bars 106 in operation. Optionally, the mounting portion is detachably mounted on the given T-Bar by accommodating a thickness of the flat vertical portion 108 of the T-Bars 106 between a recess or cavity (such as the central optical cavity 122) having an elongate U-shaped structure. In an example, the mounting portion may be coupled using a coupling means such as screws, nuts, bolts, adhesives, rivets, tie-wraps, and the like. In another example, the mounting portion may be coupled using a sliding mechanism such as a slider, a roller, and the like. In such an example, the mounting portion may slide over the flat vertical portion 108 of the T-Bars 106 and provide an ease of detaching thereof. Additionally, the mounting portion includes a thickness, a length, and a height (less than the vertical portion 108 of the T-Bars 106. Optionally, the material for manufacturing the mounting portion may include metals, metal alloys, hardened polyvinyl materials, plastics materials, glass-filled plastics materials, ceramic materials, and the like. Furthermore, optionally, the mounting portion includes a plurality of flat supporting portions. The term "flat supporting portion" as used herein relates to solid structures molded to form the mounting portion of the linear support element. Furthermore, the mounting portion of the linear support element is integral and molded in a substantially U-shaped structure. It will be appreciated that the term "substantially U-shaped structure" herein relates to a shape resembling an alphabetical letter "U" and a structure having a vertical left elongate member, a vertical right elongate member, and a curved member (or alternatively, a horizontal member) adjoining as integral to the lower end of the vertical left elongate member and the vertical right elongate member. In an example, each of the flat mounting portions are mutually separate and may be coupled to the curved member by coupling means or arrangements, such as welding, adhesives, fasteners, and the like.

The present disclosure provides an energy efficient and energy saving lighting assembly configured for enabling a reduced greenhouse gas emission from the lighting assembly by reducing the average energy consumption with respect to conventional lighting assemblies and reducing usage and implementation during times of minimal or no usage. Consequently, the ceiling grid lighting assembly can be remotely dimmable via a communication link (for example via the daisy-chain connection or via wireless control, or both) or can be controlled locally (for example by the lighting assembly having a motion sensor integrated therewith, a low-resolution charged-coupled device (CCD) camera or a photocell coupled to an image processing integrated circuit (IC) implemented as a microcontroller, a field-programmable gate array (FPGA) for motion detection, alternatively an ultrasonic motion detector).

Modifications to embodiments of the present disclosure described in the foregoing are possible without departing from the scope of the present disclosure as defined by the accompanying claims. Expressions such as "including", "comprising", "incorporating", have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A lighting assembly within a ceiling grid system, wherein the ceiling grid system comprises an array of T-Bar cells having ceiling grid T-Bars with vertical and horizontal portions, wherein a plane containing the horizontal portions of the ceiling grid T-Bars defines a ceiling grid plane, the lighting assembly comprising;

a) at least one T-Bar cell within the T-Bar grid array that provides integral structural integrity to the lighting assembly;

b) at least one assembly ceiling panel that is positioned at least partially above or below the ceiling plane;

c) at least one optical assembly comprising at least one LED light source, at least one printed circuit board, and at least one optical element;

d) at least one linear support element configured to be arranged onto a mounting T-bar within the at least one T-Bar cell, wherein the at least one linear support element comprises an elongate body configured to support and align components of the at least one optical assembly; and e) at least one covering element positioned proximate to a longitudinal end of the linear lighting module such as to provide an enclosing face of a central optical cavity within the lighting assembly; and wherein the at least one assembly ceiling panel is positioned and supported at a parallel or inclined orientation to the ceiling grid plane at a configured elevation relative to the ceiling grid plane.

2. The lighting assembly of claim 1 wherein the at least one assembly ceiling panel is positioned and supported at a parallel or inclined orientation to the ceiling grid plane at a configured elevation relative to the ceiling grid plane by the at least one linear support element.

3. The lighting assembly of claim 2 comprising two linear support elements configured to support opposing edges of a ceiling panel at an elevation relative to the ceiling grid plane.

4. The lighting assembly of claim 1 wherein the optical element is an edgelit optical element.

5. The lighting assembly of claim 4 wherein the edgelit optical element is held horizontally, vertically or obliquely.

6. The lighting assembly of claim 4 wherein the at least one LED light source is proximate to one input face of the edgelit optical element.

7. The lighting assembly of claim 1 wherein two independently electrically addressable LED light sources are positioned to input light into two edges of a single optical element and electrical power can be applied to each channel independently.

8. The lighting assembly of claim 1, wherein a portion of light from the at least one LED light source is reflected by the at least one assembly ceiling panel within the central optical cavity.

9. The lighting assembly of claim 1, wherein a portion of light emitted from the at least one optical element is projected below the ceiling grid plane and a portion is incident upon at least one assembly ceiling panel.

10. The lighting assembly of claim 1, wherein a light distribution emitted from the lighting assembly is non-lambertian and has a light distribution shape that is from the following: batwing, asymmetric, double asymmetric, narrow or medium.

11. The lighting assembly of claim 1 wherein light from the at least one LED light source is input into an input face of an edge-lit optical element and output from an adjacent face of the edge-lit optical element.

12. The at least one LED light source of claim 11 wherein the edge-lit optical element is a low clarity edge-lit diffuser or high clarity light guide.

13. The lighting assembly of claim 1, wherein the at least one optical assembly is housed in a module or cartridge configured such that it is removable from the at least one linear support element.

14. The lighting assembly of claim 1, wherein the at least one optical element is supported by the at least one linear support element at an angle parallel or perpendicular or oblique to the ceiling grid plane.

15. The lighting assembly of claim 1, wherein the at least one optical element comprises a TIR optic which receives and transmits light from the at least one LED light source.

16. The lighting assembly of claim 1, wherein the at least one optical element has a cross sectional profile shape that is rectangular, triangular, or arcuate.

17. The lighting assembly of claim 1, wherein the at least one optical assembly is further comprising a diffusing outer lens positioned to redirect light from the at least one optical element.

18. The lighting assembly of claim 1, wherein a height of the elongate body of the at least one linear support element is less than a height of the ceiling grid T-Bars.

19. The lighting assembly of claim 1, wherein the at least one linear support element comprises a clip, bracket, or latch to enable the linear support element to be mounted over the mounting T-Bar.

20. The lighting assembly of claim 1, wherein the at least one assembly ceiling panel is one of a standard ceiling panel, an acoustic ceiling panel, a decorative tile, a planar reflective panel or a non-planar reflective panel.

21. The lighting assembly of claim 1, wherein the at least one assembly ceiling panel includes a reflective surface having one of an optical property; specular, diffuse, light redirecting, and surface textured.

22. The lighting assembly of claim 1, wherein a support portion of the linear support element is configured to replicate the structure of the horizontal portion of a ceiling grid T-Bars.

23. The lighting assembly of claim 22, wherein the support portion of a linear support element is configured to replicate the structure of the horizontal portion of a 9⁄16" slot style T-Bar.

24. The lighting assembly of claim 1 further comprising a utility component supported by the at least one linear support element, selected from a group consisting of a driver, controller, alarm, sensor, ventilation fan, heater, humidifier, electronic controller, battery, wireless communication module.

25. The lighting assembly of claim 1, wherein the at least one linear support element has a 3-dimensional shape of a cross-sectional profile area extended linearly into a 3rd axis and configured to provide:

a) a central structural portion to which other portions are connected;

b) a mounting portion that extends from a top of a vertical structural portion and mounts over a vertical portion of the mounting T-Bar;

c) at least one utility component supporting portion integral with the at least one linear supporting portion; and d) at least one assembly ceiling panel supporting portion integral with the at least one central supporting portion or the at least one utility component supporting portion.

26. The lighting assembly of claim 1 wherein the at least one covering element further encloses at least one longitudinal end of the linear lighting module.

27. The lighting assembly of claim 1, wherein the at least one covering element is arranged at an angle not parallel with the ceiling grid plane.

28. The lighting assembly of claim 1 wherein the covering element is attached to an additional T-bar of the T-bar cell that is on an adjacent side from the mounting T-bar.

29. Lighting assembly of claim 1 wherein the at least one covering element has a shape that is rectangular, triangular, or arcuate.

30. The lighting assembly of claim 1 wherein the at least one covering element comprises at least one of an optical property of refraction, absorption, diffusion, reflection or scattering of incident light.

31. The lighting assembly of claim 1 wherein the least one covering element is one of a standard ceiling panel, an acoustic ceiling panel, a decorative tile, a planar reflective panel or a non-planar reflective panel.

32. The lighting assembly of claim 1, wherein the least one covering element is made of plastic, metal, glass, rubber, paper, or wood.

33. A lighting assembly within a ceiling grid system, wherein the ceiling grid system comprises an array of T-Bar cells having ceiling grid T-Bars with vertical and horizontal portions, wherein a plane containing the horizontal portions of the ceiling grid T-Bars defines a ceiling grid plane, the lighting assembly comprising a) at least one T-Bar cell within the T-Bar grid array that provides integral structural integrity to the lighting assembly;

b) at least one assembly ceiling panel and at least one surrounding ceiling panel associated with the at least one T-Bar cell, wherein the at least one assembly ceiling panel is positioned partially or fully below the ceiling grid plane;

c) at least one optical assembly comprising at least one LED light source, at least one printed circuit board, and at least one optical element; and d) at least one linear support element configured to be arranged onto a mounting T-bar within the at least one T-Bar cell wherein the at least one optical assembly is positioned to project light outwardly and away from the at least one assembly ceiling panel.

34. The lighting assembly of claim 33 wherein the at least one assembly ceiling panel is supported by the linear-support element.

35. The lighting assembly of claim 33, wherein light emitted from the at least one LED light source is reflected by the at least one surrounding ceiling panel.

36. The lighting assembly of claim 33, wherein light emitted from the at least one optical element has an optical axis that corresponds to an incident angle of light received by the at least one surrounding ceiling panel.

37. The lighting assembly of claim 33, wherein light distribution emitted from the lighting assembly has a light distribution component with an optical axis alignment that correlates with an angle of optical axis output from the at least one optical element.

38. The lighting assembly of claim 33 wherein the at least one optical element is an edgelit optical element and wherein light emitted from the at least one light source is input into an input face and output from an adjacent face of the at least one optical element.

39. The lighting assembly of claim 33, wherein the at least one optical element is supported, by the at least one linear support element, at an angle parallel or perpendicular or oblique to the ceiling grid plane.

40. The lighting assembly of claim 33, wherein the at least one optical element comprises a TIR optic which receives and transmits light from the at least one LED light source.

41. The lighting assembly of claim 33, wherein the at least one optical element has a cross sectional profile shape that is rectangular, triangular, or arcuate.

42. The lighting assembly of claim 33, wherein the at least one linear support element is detachably coupled to the ceiling grid T-Bars.

43. The light assembly of claim 33, wherein the at least one linear support element comprises a clip, bracket, or latch.

44. The lighting assembly of claim 33, wherein the lighting assembly spans and connects opposing sides of the T-Bar cell.

45. The lighting assembly of claim 33, wherein the lighting assembly spans and connects adjacent sides of the T-Bar cell.

46. The lighting assembly of claim 33, wherein the at least one assembly ceiling panel or the at least one surrounding ceiling panel are one of a standard ceiling panel, an acoustic ceiling panel, a decorative tile, a planar reflective panel or a non-planar reflective panel.

47. The lighting assembly of claim 33, further comprising an attachment point for suspension from a structural ceiling.

48. The lighting assembly of claim 47, wherein the attachment point is located within the at least one linear support element.

49. The lighting assembly of claim 33, further comprising a utility component, supported by the at least one linear support element, selected from a group consisting of an alarm, a sensor, a ventilation fan, a heater, a humidifier, an electronic controller, a battery, a wireless communication module.

50. The lighting assembly of claim 33, wherein the at least one linear support element comprises;

a) a central structural portion to which other portions are connected;

b) a mounting portion that extends from a top of the central structural portion and mounts over a vertical portion of a T-Bar;

c) at least one utility component supporting portion integral with the at least one linear supporting portion; and d) at least one ceiling panel supporting portion integral with the at least one linear supporting portion or the at least one utility component supporting portion.

51. The lighting assembly of claim 33 further comprising at least one covering element positioned proximate to a longitudinal end of the linear lighting module such as to provide an enclosing face of a central cavity within the lighting assembly.

52. The lighting assembly of claim 33 wherein the at least one covering element further encloses at least one longitudinal end of the linear lighting module.

53. The lighting assembly of claim 33 wherein the at least one covering element has a shape that is rectangular, triangular, or arcuate.

54. The lighting assembly of claim 33 wherein the least one covering element is one of a standard ceiling panel, an acoustic ceiling panel, a decorative tile, a planar reflective panel or a non-planar reflective panel.

55. The lighting assembly of claim 33, wherein the least one covering element is made of plastic, metal, glass, rubber, paper, or wood.

* * * * *